United States Patent [19]

Floro et al.

[11] Patent Number: 4,809,217

[45] Date of Patent: Feb. 28, 1989

[54] REMOTE I/O PORT FOR TRANSFER OF I/O DATA IN A PROGRAMMABLE CONTROLLER

[75] Inventors: William E. Floro, Willoughby; Mark Luboski, Euclid; Timothy J. Murphy, Parma, all of Ohio; Alan J. Campbell, New Berlin, Wis.

[73] Assignee: Allen-Bradley Company, Inc., Milwaukee, Wis.

[21] Appl. No.: 793,588

[22] Filed: Oct. 31, 1985

[51] Int. Cl.⁴ .................... G06F 13/12; G06F 15/16
[52] U.S. Cl. ............................................ 364/900
[58] Field of Search ... 364/200 MS File, 900 MS File

[56] References Cited

U.S. PATENT DOCUMENTS

| | | | |
|---|---|---|---|
| 4,250,563 | 2/1981 | Struger | 364/900 |
| 4,276,594 | 6/1981 | Morley | 364/200 |
| 4,293,924 | 10/1981 | Struger et al. | 364/900 |
| 4,298,928 | 11/1981 | Etoh et al. | 364/200 |
| 4,319,338 | 3/1982 | Grudowski et al. | 364/900 |
| 4,413,319 | 11/1983 | Schultz et al. | 364/200 |
| 4,442,504 | 4/1984 | Dummermuth et al. | 364/900 |
| 4,477,882 | 10/1984 | Schumacher et al. | 364/900 |
| 4,510,565 | 4/1985 | Dummermuth | 364/136 |
| 4,665,483 | 5/1987 | Ciacci et al. | 364/200 |

OTHER PUBLICATIONS

Product Summary, Automate 30-Automate 40, Reliance Electric Company, Mar. 21, 1985, pp. 14-15.
Chapters 3 & 4 of Robert E. Wilhelm, Jr.'s "Programmable Controller Handbook", Hayden Publishing Co.

Primary Examiner—Thomas M. Heckler
Assistant Examiner—Christina M. Eakman
Attorney, Agent, or Firm—Quarles & Brady

[57] ABSTRACT

A method and apparatus for access to a programmable controller at a remote location. A peripheral device with a peripheral processor is connected to a port on an I/O module. Blocks of discrete and block transfer data are transferred to and from a common memory in the I/O module where the data is accessible to a serial communication controller that interfaces the module to a high speed serial data channel. Asynchronous communication is provided between the serial communication controller and the peripheral device using a circular buffer in the common memory. Timing considerations are also disclosed.

14 Claims, 12 Drawing Sheets

Microfiche Appendix Included
(4 Microfiche, 242 Pages)

REMOTE I/O PORT FOR TRANSFER OF I/O DATA IN A PROGRAMMABLE CONTROLLER

Microfiche Appendix B with 4 microfiche containing a total of 242 frames is incorporated herein.

BACKGROUND OF THE INVENTION

1. Field of the Invention

The invention relates generally to digital controllers for controlling industrial machines and processes, and more particularly, to programmable controllers.

2. Description of the Prior Art

In the simplest system architecture for a programmable controller, the controller includes a processor module and several I/O modules which are supported in the same equipment rack and electrically connected through a backplane circuit board. The backplane circuit board, or simply "backplane" as it is often referred to, is a circuit board with numerous printed circuit paths or traces extending horizontally across the back of the rack to interconnect the modules in the rack.

In a more complex system architecture shown and described in Schultz et al., U.S. Pat. No. 4,413,319, issued Nov. 1, 1983, a programmable controller can also include a stand-alone main processor and a number of "remote" I/O racks strung out along serial communication channels. Schultz et al. disclosed a scanner module that was capable of sending and receiving blocks of I/O status data, using a protocol developed for a high speed serial data channel. The scanner module controlled the processor end of the serial data channel, while at remote locations adapter modules converted the data to the parallel data used by I/O modules. The adapter modules, however, were limited to communicating with the I/O modules through the backplane of an I/O rack. The adapter modules were also limited in that they did not include any user-accessible communication ports.

As technology moves toward greater automation of manufacturing operations, it has become desirable to connect motor controllers to programmable controller systems. Whereas the typical I/O modules of the prior art communicated bytes of I/O status data, motor controllers often utilize blocks of data to provide motor control positioning data or motor operating parameters. Other I/O peripherals which require large groups of data are also being developed. There has not been a general purpose, programmable controller interface module for these more complex I/O devices, with the result that special purpose interfaces were needed to connect these I/O devices to the programmable controller systems mentioned above.

SUMMARY OF THE INVENTION

The invention relates to a method and apparatus for accessing a programmable controller system at a location remote from a programmable controller system processor to transfer blocks of I/O status data to and from a peripheral device.

The invention allows a peripheral processor to be coupled to a remote I/O port, which in turn is coupled to a serial communication channel through a common memory. The memory is accessible by a serial communication controller and is also accessible though the I/O port. Signals are coupled between the peripheral and the arbitration circuit through the I/O port to obtain access to the common memory. The peripheral processor then determines the availability of a block of data for transfer to or from an area in the common memory that is associated with a programmable controller system-mapped I/O address. If available, the block of data is transferred to or from the area in memory by coupling address, data and control signals with the common memory through the I/O port. The I/O port is a parallel data I/O port that allows a higher rate of data transfer and requires less software development than a serial data I/O port. After data is transferred to the common memory, the common memory is released to permit access to it by the serial communication controller.

The common memory contains respective areas for "discrete" I/O status data and "block transfer" I/O status data. In both areas the data is stored as a block, however, the "discrete" I/O status data is mapped byte-by-byte to system I/O addresses for slots in an I/O rack while the "block transfer" I/O status data is associated as a block with a system I/O address for an individual slot in an I/O rack. With the present invention, these system I/O addresses are seen from the system processor in this way, but the module that includes the common memory is not, in fact, within an I/O rack.

Asynchronous communication of blocks of I/O status data between the programmable controller system and the user-selected peripheral processor is provided through a circular buffer. The programmable controller system and the user-selected peripheral processor each maintain a pointer to keep track of the next buffer area holding or receiving a block of I/O status data. These pointers allow the programmable controller system and the peripheral processor to operate within their own respective memory access time constraints. The use of the pointers also allows the programmable controller system and the peripheral processor to read or write several blocks of I/O data without waiting for each other.

To assure proper communication and updating by the processors having access to the common memory, several time-related methods are employed. First, the time of access to the common memory by the peripheral processor is monitored in relation to an access time parameter to assure that the other side of the system, represented by the serial interface processor, is not denied access for an inordinate amount of time. Second, a pair of handshake words are stored in the common memory. At regular intervals each processor obtains access to the memory, updates one handshake word and confirms that the other processor has updated another handshake word within a predetermined handshake interval.

The apparatus of the invention is a remote I/O port module with the serial channel controller, the common memory and the arbitration circuit mentioned above, and with a serial I/O port on one side and with a parallel data I/O port on the other side. Unlike the typical I/O module, this module is not intended for insertion in an I/O rack of the type in which modules are electrically connected through a backplane circuit board. This results in a reduction of the hardware required to connect specialized I/O modules that may be developed by users or third parties.

These and other objects and advantages of the invention will become apparent from the following description in which reference is made to the accompanying drawings and to the appendices, which form a part hereof, and in which there is illustrated by way of example, a preferred embodiment of the invention. This example does not necessarily represent the full scope of the invention, however, the reference is made to the claims that follow the description for determining the various embodiments that come within the scope of the invention.

DETAILED DESCRIPTION OF THE PREFERRED EMBODIMENT

A. Programmable Controller System Architecture

Figure 1:
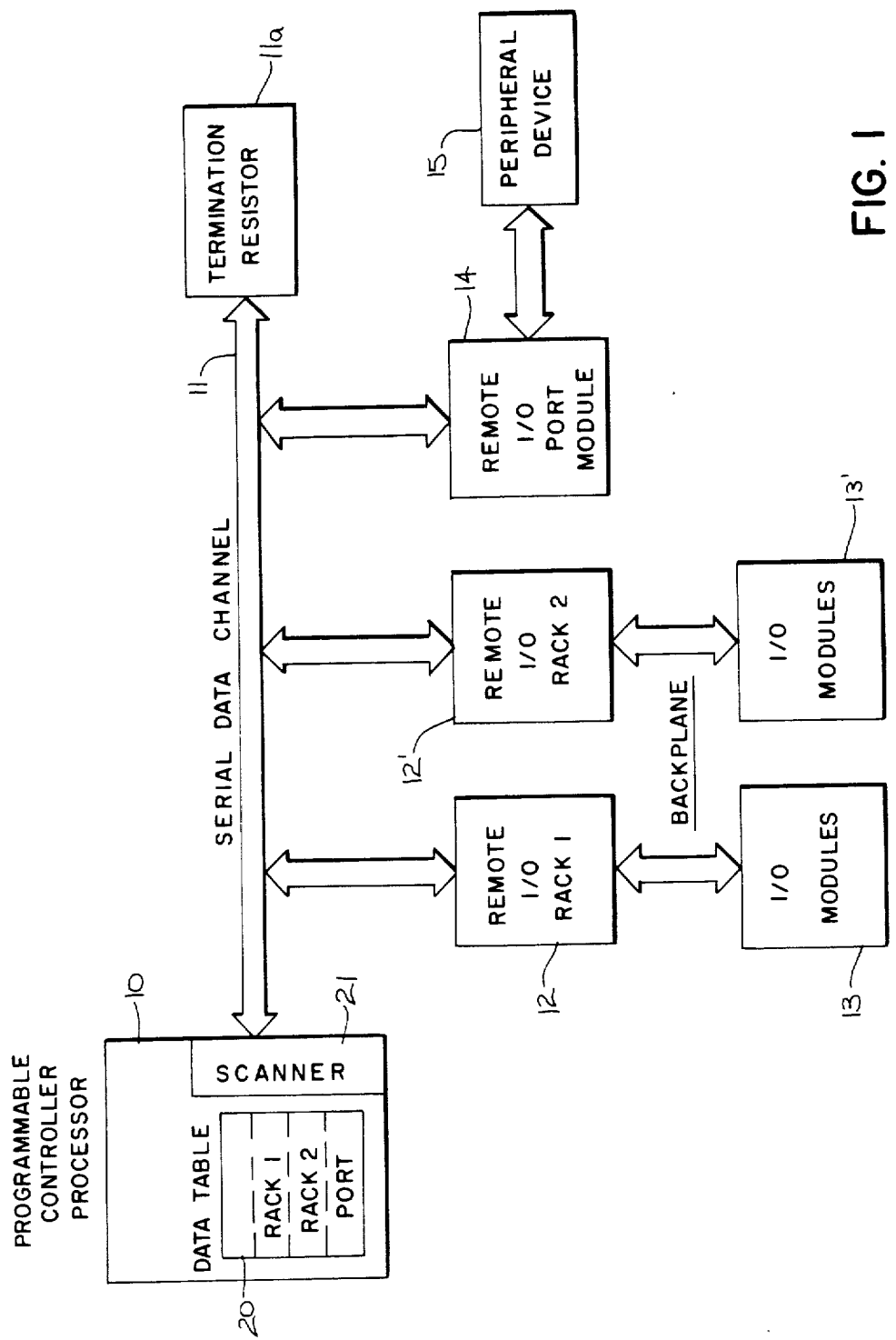
FIG. 1 is a general block diagram of a programmable controller system that uses the remote I/O port module of the present invention.

FIG. 1 shows a programmable controller system which utilizes the method and apparatus of the invention. A programmable controller processor unit 10 is connected via a serial data channel 11 in the form of a communication cable and drop lines to a pair of remote I/O racks 12 and 12' holding respective groups of I/O modules 13 and 13'. The programmable controller processor 10 is also connected through another one of the drop lines to a remote I/O port module 14, which interfaces a peripheral device, such as a motor controller, to the programmable controller system. A termination resistor 11a is connected at the end of serial data channel 11.

The general functions of the programmable controller processor 10 and the I/O modules 13,13' are well-known to those skilled in the art. The programmable controller processor 10 executes a control program, sometimes also referred to as a user's application program, because the program is developed in a user program language for one of many possible industrial applications. In executing the program, the programmable controller processor 10 generates output status data in response to the state of input status data and according to the logic contained in the user control program. At some predetermined time, in this instance between cycles of control program execution, the programmable controller processor 10 executes a remote I/O scan in which input status data is read from those of the I/O modules 13,13' that are input modules, and output status data is written to those of the I/O modules 13,13' that are output modules.

The I/O modules 13,13' that are input modules convert AC and DC signals from input devices, such as sensors, limit switches and push buttons, to digital logic-level signals that can be stored as input data. The I/O modules 13,13' that are output modules convert digital logic-level signals to AC and DC signals for operating output devices such as relays and motor contactor switches.

The I/O modules 13,13' are inserted into slots in the equipment racks 12,12' and plug into edge connectors mounted on a backplane circuit board, or simply "backplane," which extends across the back side of each rack 12,12'. The backplane includes a large number of circuit paths or "traces" extending horizontally to interconnect the I/O modules 13,13' in the respective racks 12,12'. A group of these circuit paths form a byte-wide parallel data bus for carrying bytes of I/O status data to and from the I/O modules 13,13'.

The invention concerns a method and apparatus for connecting a specialized peripheral device to the programmable controller system at a location that is remote from the programmable controller processor. As seen in FIG. 1, the programmable controller processor unit 10 maintains a data table 20 with a copy of the I/O status data for each of the racks of I/O modules 13,13', as well as a group of data associated with the remote I/O port module 14. The programmable controller processor unit 10 also includes a scanner circuit 21 seen in FIG. 1 and described in U.S. Pat. No. 4,442,504, issued Apr. 10, 1984. This scanner circuit 21 was originally designed to connect through a serial channel to I/O interface adapter modules (not shown) occupying slots in the remote I/O racks 12,12'.

Figure 2:
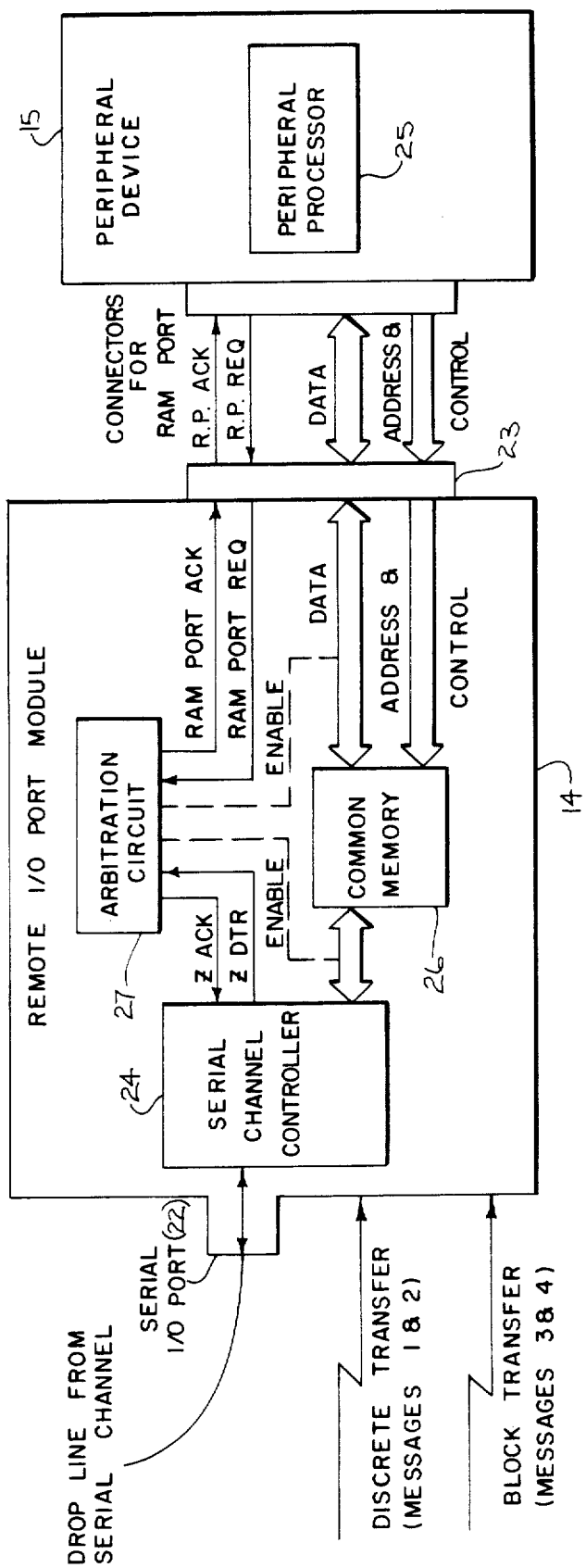
FIG. 2 is a general block diagram of the remote I/O port module of FIG. 1.

FIG. 2 shows the primary elements of the I/O port module 14. The module has a serial I/O port 22 that connects to the serial data channel 11 running from the programmable controller processor unit 10. A serial channel controller 24 is coupled to the serial I/O port 22 to control transmission and reception of I/O status data in serial data format as it travels back and forth through the channel 11 from the programmable controller processor unit 10. The serial channel controller 24 couples the I/O status data in block format to a common read/write memory 26. On the other side of the I/O port module 14, a peripheral processor 25 in a peripheral device 15 connects to a RAM port 23 to communicate multiword blocks of I/O status data to and from a common read/write memory 26 through the RAM port 23. The serial channel controller 24 and the peripheral processor 25 are also connected to an arbitration circuit 27 which allows them to share access to the memory 26.

The peripheral processor 25 gains access to the common memory 26 by generating a signal on a RAM PORT REQ line seen in FIG. 2. A signal on this line will cause the arbitration circuit 27 to return an active signal on the RAM PORT ACK line, when the common memory 26 is available for the reading and writing of data by the peripheral processor 25. Periodically, the peripheral processor 25 must release its control of the common memory 26 by removing the active signal from the RAM PORT REQ line. If the serial channel controller 24 then generates a control signal referred to as Z DTR in FIG. 2, the arbitration circuit 27 will return an active signal on a Z ACK line, and the common memory 26 will be available to the serial channel controller 24 for reading and writing data.

B. Communication Modes for I/O Status Data Transfer

The basic function of the remote I/O port module 14 is to couple I/O status data in bulk in both directions between the serial data channel 11 and the peripheral device 15. Whereas, I/O status data is typically associated as one or two bytes with an individual I/O module, the object here is to transfer as many as 128 bytes of I/O status data as a block of I/O status data between the serial data channel 11 and the remote I/O port 23. The serial channel controller 24 formats data that it transmits on the serial data channel 11 and separates incoming data from serial channel control information. The peripheral device 15 assumes the system I/O address of the remote I/O port module 14. Therefore, the peripheral device can read and write I/O status data in the common read/write memory 26 without interpretation of the address and control information required for communication on the serial data channel 11.

The remote I/O port module 14 operates in one of two modes of operation, according to the setting of a DIP switch (not shown). The first mode is referred to as "discrete transfer" and the second mode is referred to as the "block transfer" mode, and these correspond to one of two types of serial data transfer shown in FIG. 2. To understand the difference, please refer to FIGS. 6 and 7.

Figure 6:
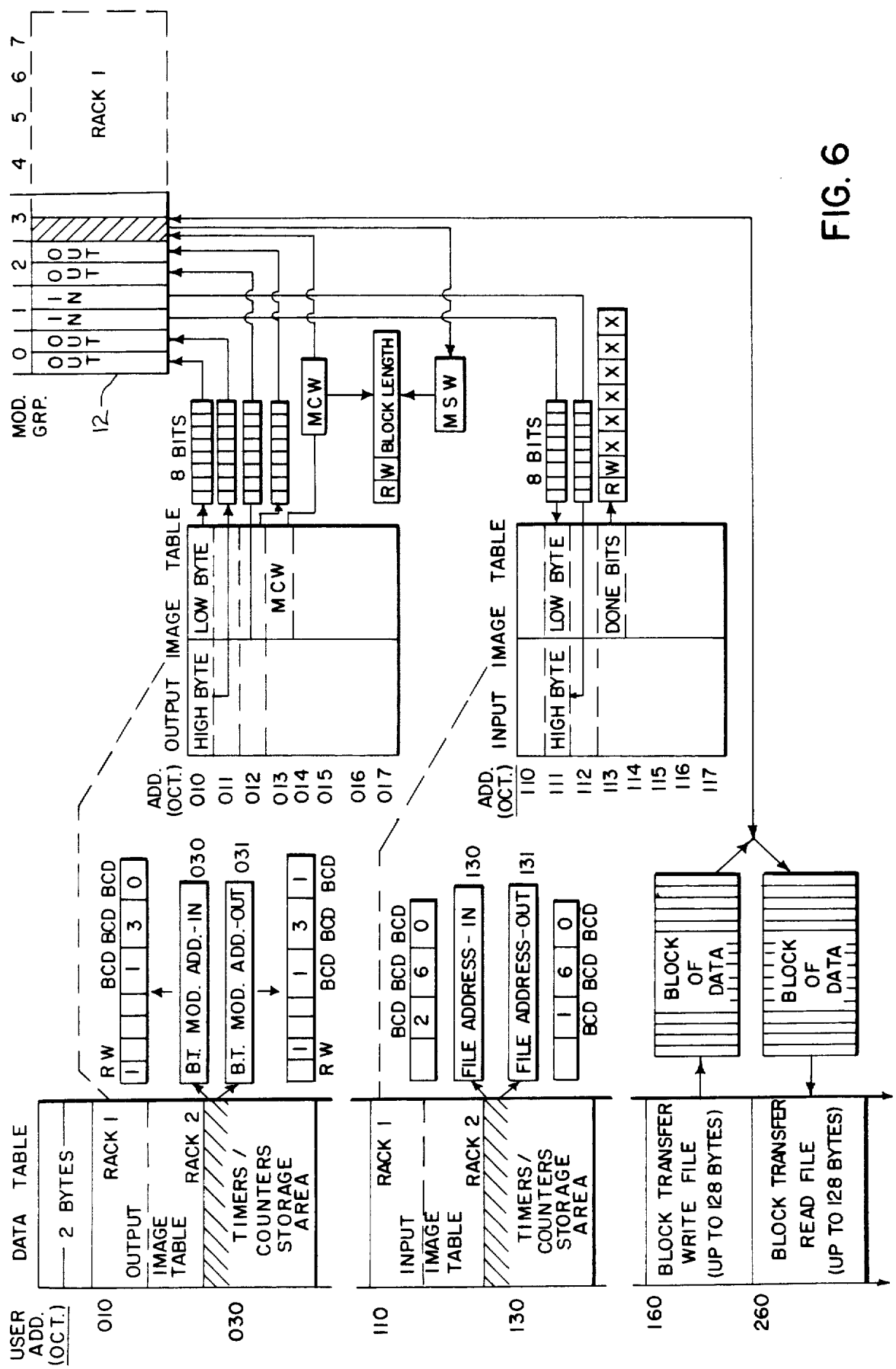
FIG. 6 is a map of a main memory in the programmable controller processor of FIG. 1 as it relates to I/O addressing.

FIG. 6 shows the general organization of a data table of the type stored by the programmable controller processor 10. To provide a step-by-step explanation, the diagram in FIG. 6 has been drawn as if the programmable controller processor 10 were connected to one of the conventional I/O racks 12. The I/O status data for each I/O rack 12 and 12' is divided into output status data, which is stored in an image table beginning at 010(octal), and input status data, which is stored in an image table beginning at 110(octal). (The octal numbering system is used in user application programs to identify input and output addresses.)

As seen in the expansion of these two image tables, each addressable location in memory stores two bytes of I/O status data a low byte and a high byte. During the input/output scan operation, output data is transmitted to output modules, which are organized in pairs or "module groups" for addressing purposes. Each full rack includes eight module groups numbered from 0-7-(octal). If, for example two output modules are located in Module Group 0 of Rack 1, then a low byte will be transmitted to the first one and a high byte will be transmitted to the second one, assuming they are of byte-sized capacity. To continue the example, if two input modules are located in Module Group 1 of Rack 1, a low byte of input status data will be read from the first one, and a high byte of input status data will be read from the second one, and these two bytes will be received and stored in corresponding locations in the input image table. A place is reserved in both the output image table and the input image table for each physical I/O location so that either an input module or an output module can be placed in any location in the I/O rack 12.

Discrete transfer of I/O status data is a type of memory—mapped input/output addressing in which the individual bytes or words of I/O status data are related according to their sequence to corresponding I/O modules. At some point along the path of communication, it is contemplated that the data will be coupled to I/O modules in a hardware-implemented I/O scanning sequence, which is controlled by a set of instructions for a microprocessor. In executing this sequence the I/O status data is transferred without any accompanying address information.

FIG. 6 also illustrates a "block transfer" to a bidirectional block transfer I/O module in the low byte position in Module Group 3 in Rack 1. The block transfer is controlled by a sequence of microprocessor instructions that is more sophisticated than the basic I/O scanning sequence and by parameters which are supplied by the user in the user-language application program. The first of these parameters is a module control word (MCW) which is stored in the output image table location, so that it will be transmitted to the block transfer module (shaded area in Rack 1 in FIG. 6). This word is actually a "byte" with read and write flag bits as the high order bits "6" and "7", followed by a "block length" number of six bits. This number indicates how many two-byte words of I/O status data will be transmitted as a block to the single I/O address occupied by the block transfer module.

A second parameter that is provided by the user for execution by the block transfer programming is a data address where a third parameter provided by the user—the I/O address of the block transfer module—is stored. The data address is preferably the first location in a timers and counters area, which is searched by the block transfer program to find the I/O address. If the block transfer module is bidirectional, one address is stored for input and one address is stored for output, as shown at locations 030 and 031(octal) in FIG. 6. The address work format includes "read" and "write" direction flags and three binary-coded decimal numbers specifying the I/O address.

A fourth parameter that is provided by the user for execution by the block transfer programming is a file address where the block of I/O status data can be stored, as it is too large to be stored in the image table. This address is stored at an address in a second timers and counters area that will be automatically searched in response to the block transfer program and the user-provided data address. If the block transfer module is bidirectional, one address is stored for input and one address is stored for output, as shown at locations 260 and 160(octal) in FIG. 4. The address word format includes three binary-coded decimal numbers specifying the file address.

The last parameters to be discussed in relation to FIG. 6 are the "done bits" which are stored in the input image location corresponding to the I/O address of the block transfer module. These are the "R" (read done) and "W" (write done) bits. The "X" bits are irrelevant.

When viewed in the context of local programmable controllers the "block transfer" mode requires more program control than the I/O scan of discrete bytes of I/O status data. The block transfer mode does, however, permit larger groups of data to be handled in bulk.

The transfer of I/O status data in the discrete and block transfer modes occurs, not in a local system as assumed for FIG. 6, but in a remote system where I/O status data is communicated long distances over a serial data link. Therefore, the handling of groups of discrete data and block transfer data for serial transmission will be considered next.

C. Communication on the Serial Data Channel

Figure 7:
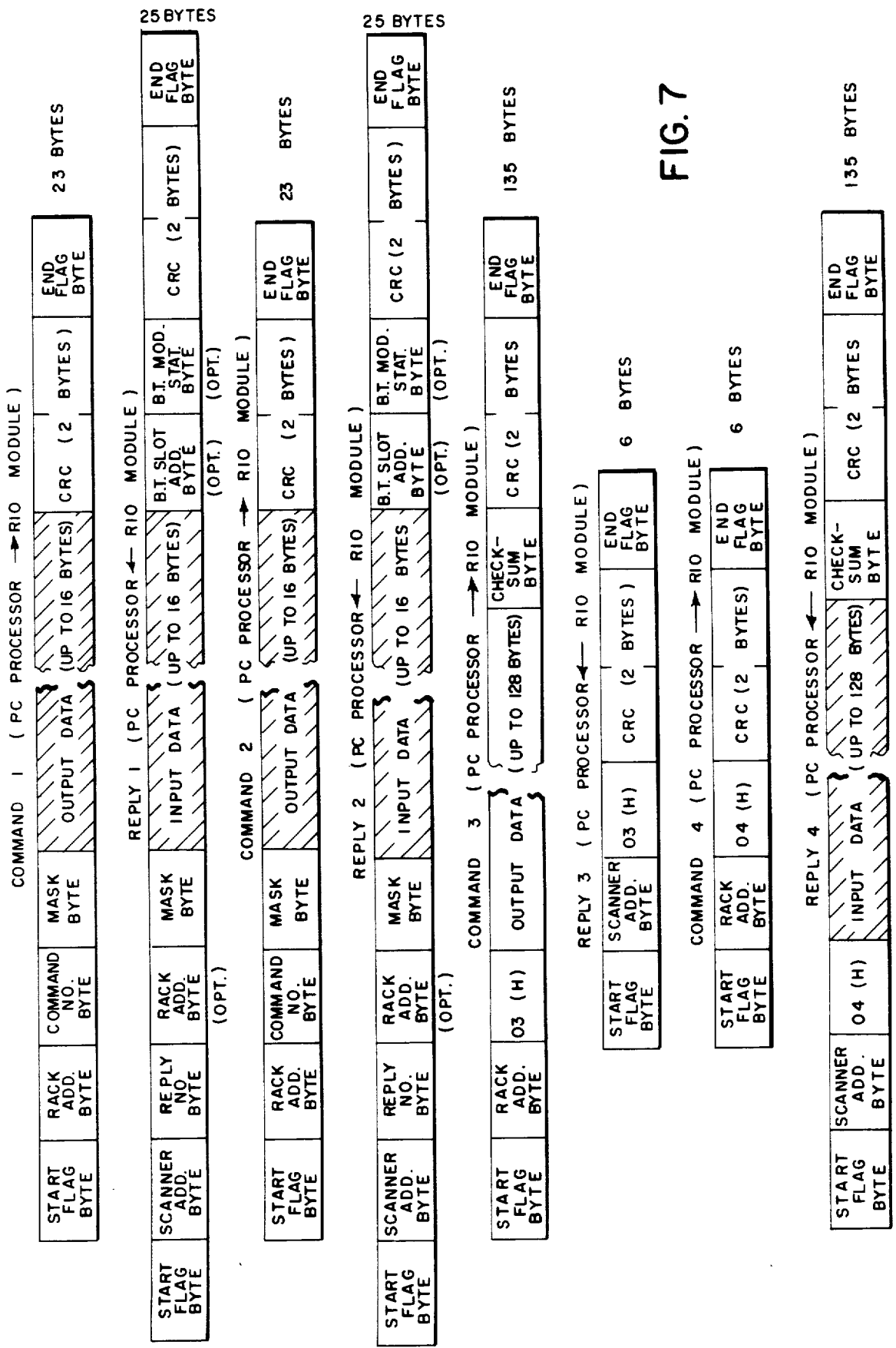
FIG. 7 is a map of a series of messages which are transmitted between the programmable controller processor and the remote I/O port module.

FIG. 7 illustrates the messages used for communication on the serial data channel 11. These are consistent with the protocol disclosed for remote transfer of I/O status data in Schultz et al., U.S. Pat. No. 4,413,319, cited earlier herein. Each message constitutes a string of data referred to more generally as a "frame". Generally, the frame for all eight of the messages is organized as follows:

START FLAG/SYSTEM ADDRESS/COMMAND OR REPLY NO./MASK/INPUT-OUTPUT STATUS DATA/B.T. STATUS/CRC/END FLAG

The start and end flags are segments with values that the transmitting and receiving circuitry will recognize as the beginning and end of a frame, respectively. One example of a system address is the destination address of an I/O rack. The remote I/O port module 14 is also addressed in the manner of an I/O rack even though it is physically dissimilar from the other I/O racks 12 and 12'. It should therefore be understood that the following description concerning the I/O racks 12 and 12' also applies to the remote I/O port module 14. The scanner portion 21 of the programmable controller processor 10 in FIG. 1 also has a system address, which is used in messages sent back to the programmable controller processor 10 from the I/O racks 12 and 12'.

The system address is followed by a segment that includes the identifying number for a command or reply message. There are four different "command" messages identified in FIG. 7 as Commands 1–4 and four different "reply" messages identified in FIG. 7 as Replies 1–4. The Command 2 message, for example, would include a binary-coded "2" in the command identifier segment. The command or reply identifier segment is followed by a "mask" segment, which is a coded identification of the input or output status data that follows it. This segment identifies up to sixteen bytes of input or output status data which are related to individual I/O modules in an I/O rack. Alternatively, the input or output status data can be sent in a larger block, up to 128 bytes, to a single I/O address, and this is referred to as "block transfer".

To execute a block transfer of I/O status data, special information is transmitted in some of the messages. This includes a block transfer module control word (referred to as the first MSW in U.S. Pat. No. 4,413,319). This word is a data byte with a read and write flag in bits "6" and "7" and with a block size number in bits "0" through "5". It is transmitted as part of the output data in the Command 1 or Command 2 message. A block transfer module status word (referred to as the second MSW in U.S. Pat. No. 4,413,319) is returned in one of the reply messages in response to the module control word, however, the module status word is assigned a separate location in the frame following any I/O status data that is returned. Also, when a block of I/O status data is transmitted, it is sent with its own checksum. The message frame contains a CRC (cyclic redundancy code) segment to detect communication errors in other segments. The checksum is an additional step to check the integrity of a block of data as it travels from its source to its destination.

The message segments in the present example are organized in terms of one or more "bytes" having eight individual bits of data associated together. These bytes may in some instances be referred to as "words", which is a more general term for describing data strings of four bits, eight bits, sixteen bits, or even thirty-two bits in length. Although the description herein is largely in terms of bytes, it should be apparent that the invention can be used with data words of other sizes.

Referring again to FIG. 1, when one of the messages of FIG. 7 is transmitted by the programmable controller processor 10, it travels through the serial data channel 11 to all of the racks (and to the remote I/O port module 14) hooked up to it, but only those receiving racks that have a matching address will respond with a Reply message. Communication is carried out in a half-duplex mode, meaning that first a message is sent in one direction through the serial data channel, and then a message is returned in the opposite direction. At any particular time the channel supports a single message traveling in a single direction.

The Command 1 message is a polling message which seeks replies from the I/O racks in the system to provide the scanner 21 with initial information on the number, size and distribution of I/O racks along the serial data channel. When the Command 1 message is sent, the outputs connected to the receiving I/O rack are held reset, so the output status data is not communicated to its normal destination. The Command 1 message can prepare for an output of block transfer data by signaling a block transfer "not busy" bit as part of its command identification byte, and by sending a block transfer module control byte as part of its output data. As seen in FIG. 7, a Command 1 message may include up to 23 bytes of data.

Assuming the Command 1 message is received with a matching address by an adapter module in an I/O rack or a remote I/O port module 14, the module will respond with a Reply 1 message as seen in FIG. 7. After its start flag byte, the scanner address byte, and the reply identification byte, the rack address is inserted, as a group of data used by the programmable controller processor 10 of this example, but not by all other system processors which can also be employed as system processors. This byte is followed by the mask and the input data from low-density, eight-bit I/O modules in the rack or equivalent input data from the remote I/O port module 14. If the rack 12 is requesting a block transfer of I/O status data, a B.T. slot address and the B.T. module status byte follow the input data for the low-density I/O modules. With a CRC segment of two bytes and an end flag byte the Reply 1 message may contain up to 25 bytes of information.

As seen in FIG. 7, the Command 2 message and the Reply 2 message have the same organization as the Command 1 message and the Reply 1 message, respectively. The Command 2 message is sent after the scanner 21 and the remote I/O port module 14 have initiated communication, so the outputs are no longer held reset, and the output data will be used in controlling output devices. The sequence of sending the Command 1 message, receiving the Reply 1 message, and then sending the Command 2 message means that input data from a rack is received by the programmable controller processor 10 before output data is sent back to the rack. The Command 2 message and the Reply 2 message are then transmitted back and forth to couple I/O status data of the type that is exchanged between a processor and I/O modules in the same rack during an I/O scan sequence, which is executed between cycles of a user application program. The sending and receiving of these messages achieve the transfer of "discrete" I/O status data over the serial data channel 11.

A request for executing a block transfer of I/O status data is returned in either the Reply 1 message or the Reply 2 message, according to whether the request occurs during startup of communication or after communication has been established. The block transfer request is returned as a bit in the reply byte of the respective messages. The B.T. module status byte that is returned determines whether the block transfer is a write operation (output from the programmable controller processor 10) or a read operation (input to the programmable controller processor 10).

The Command 3 message is transmitted by the programmable controller processor 10 to write a block of I/O status data to an I/O rack or to the remote I/O port module 14. Up to 128 bytes of I/O status data and a checksum follow the command byte, which has the value 03 (hexadecimal) as seen in FIG. 7. The complete message or frame may contain up to 135 bytes. The remote I/O port module 14 returns a Reply 3 message in response to the Command 3 message to confirm the success of the transfer. The Reply 3 message does not contain any I/O status data, but only the start and end flag bytes, the scanner address byte, the reply byte and a two-byte CRC for a total of six bytes.

The read transfer is handled in obverse fashion. A Command 4 message of six bytes similar to the Reply 3 message is sent from the programmable processor 10 to the remote I/O port module 14. This message triggers a response of a Reply 4 message of up to 135 bytes, with a format similar to the Command 3 message, except for the message identification and the direction of transmission. The Reply 4 message includes up to 128 bytes of I/O status data and an accompanying checksum that are read by the programmable controller processor 10.

To summarize, I/O status data is transferred in the "discrete" mode through the Command 1 and Command 2 messages and the Reply 1 and Reply 2 messages. In the "block transfer" mode, the Command 1 and Command 2 messages and the Reply 1 and Reply 2 messages set up the I/O data transfer, which is then accomplished by either the Command 3-Reply 3 message pair or the Command 4-Reply 4 message pair, according to the direction of transfer.

D. Details of the Circuitry

Figure 3:
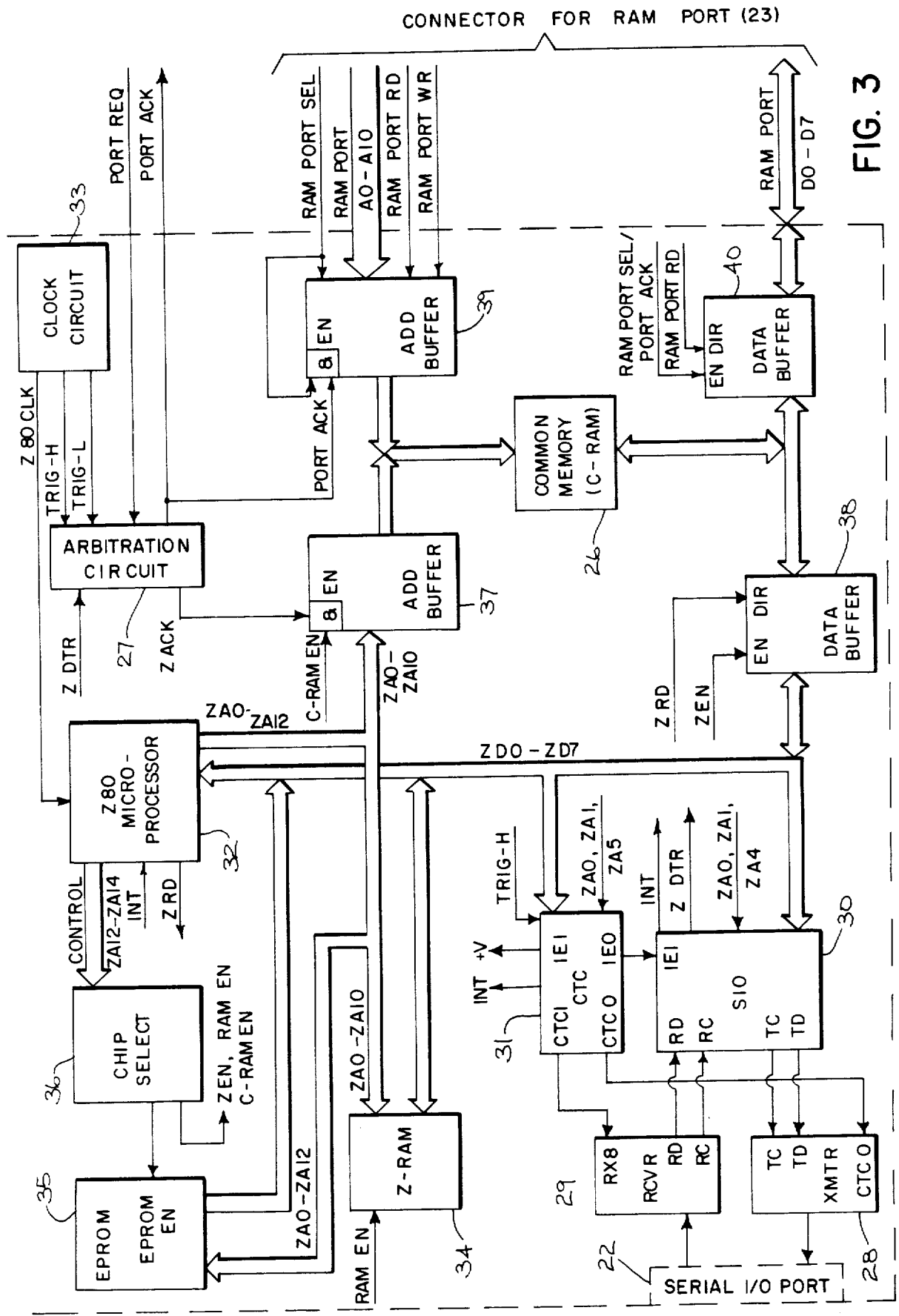
FIG. 3 is a more detailed block diagram of the remote I/O module of FIG. 2.

FIG. 3 shows the details of the serial channel controller 24 and its connection to the common memory 26 and to the arbitration circuit 27. Starting at the lower left, the serial I/O port 22 connects to three outputs on a transmitter (XMTR) circuit 28 and to three inputs on a receiver (RCVR) circuit 29. The XMTR circuit 28 is connected to receive transmit clock (TC) signals and transmit data (TD) signals from a serial input/output (SIO) circuit 30, which in the preferred embodiment is a Z80-SIO circuit available from Zilog, Inc., and other known sources. These signals are further timed with reference to a CTC 0 clock frequency received from a counter/timer (CTC) circuit 31, which in the preferred embodiment is a Z80-CTC circuit available from Zilog, Inc., and other known sources. The XMTR circuit 28 encodes serial data as Manchester-coded signals, which are then transmitted through the serial I/O port 22.

The RCVR circuit 29 is connected to pass the Manchester-coded signals to the SIO circuit 30 on the receive data (RD) line and to recover "receive clock" (RC) signals from the data stream. It then passes the RC clock signals to the SIO circuit 30 to assist in decoding data in the SIO circuit 30. An RX8 clock frequency is generated by the CTC circuit 31 and is used by the RCVR circuit 29 to assist in recovering the RC clock signals from the Manchester-coded transmission signals.

The SIO circuit 30 is a two-channel, programmable peripheral circuit. Its primary function is to convert between serial data and parallel data. It also handles data according to various serial data protocols. The SIO circuit 30 is connected to a microelectronic CPU or microprocessor 32 through eight lines (ZDO-ZD7) of a Z80 data bus to receive status information or data to be sent to it from the microprocessor 32, or to transmit control/status information or data to the microprocessor 32. Control/status signals, channel select and chip select signals are transmitted to the SIO circuit 30 through lines ZA0, ZA1 and ZA4 of a processor address bus.

The CTC circuit 31 is a four-channel component for providing timing and counting functions from internal timers and counters. These can be programmed via control information received from the microprocessor 32, which in the preferred embodiment is the Z80-CPU available from Zilog, Inc., or other known sources. The control information or data is sent to the CTC circuit 31 from the microprocessor 32 through the eight lines (ZD0-ZD7) of the Z80 data bus. Two binary-coded channel select signals are sent to the CTC circuit 31 on lines ZA0 and ZA1 of the processor address bus, while a chip select signal is coupled on line ZA5. The CTC circuit 31 is incremented either by a trigger signal (TRIG-H) or the Z80 clock signal, both of which are transmitted by a clock circuit 33. The trigger signal (TRIG-H) is also used for synchronization in the arbitration circuit 27.

The SIO and CTC circuits 30 and 31 are connected in an interrupt priority chain through interrupt enable inputs and outputs. The interrupt enable input (IEI) on the CTC circuit 31 is pulled high, while the interrupt enable output (IEO) is connected to IEI input on the SIO circuit 30. This gives the CTC circuit 31 priority over the SIO circuit 30 in generating interrupts to the microprocessor 32. Interrupt request (INT) outputs on both the SIO and CTC circuits 30 and 31 are connected in common to an interrupt (INT) input on the microprocessor 32. The microprocessor 32 reads a byte of information sent to it over the Z80 data bus to distinguish which of these devices is sending an interrupt signal and the nature of the interrupt signal.

Figure 8:
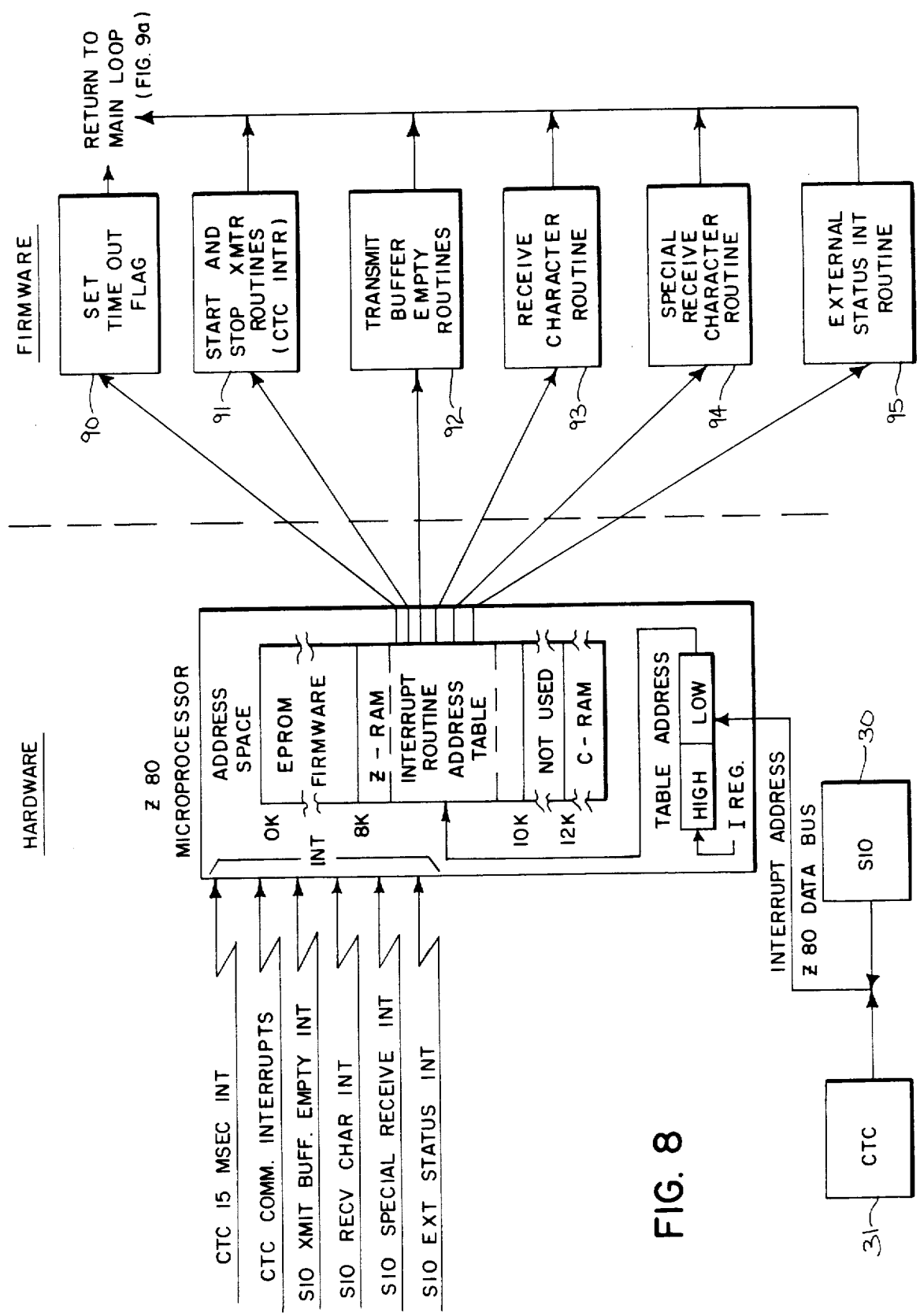
FIG. 8 is a hardware-firmware schematic for the serial interface processor of FIG. 3.

Referring to FIG. 8, it will be seen that six types of interrupt signals are received from the SIO and CTC circuits 30 and 31. The CTC circuit 31 generates an interrupt signal each 15 milliseconds, as well as a group of communication interrupts when communication is taking place over the serial channel. The SIO circuit 30 generates four different types of interrupts, including XMIT BUFFER EMPTY interrupts during serial data transmission, and three other types of interrupts, the RECEIVE CHARACTER interrupt, the SPECIAL RECEIVE interrupt, and an EXTERNAL STATUS interrupt during reception of serial data.

When an interrupt signal is generated at the INT input of the microprocessor 32, a byte of information is communicated over the Z80 data bus, where it becomes the lower portion of a sixteen-bit interrupt table address pointer. The upper portion is stored in an I register during start up operations. Using this pointer, the Z80 microprocessor 32 addresses a table in memory where the starting addresses for various routines of processor instructions are stored. It selects one of these starting addresses to obtain the next instruction to be executed.

The subsequent instructions in the routine are then executed to carry out the function of the interrupt. At the end of this execution, the Z80 microprocessor 32 returns to a main loop portion of its overall program. It should be noted that, in response to a CTC 15-millisecond timer interrupt, only a time out flag bit is set, and the time out function is performed later in response to detection of this bit. The use of the above-described interrupts allows the peripheral circuits to signal back to the Z80 microprocessor 32 and to provide two-way communication between the programmable controller processor 10 and the serial channel controller 24.

This has been by way of a general introduction to these sophisticated peripheral circuits. For further information concerning their architecture and functions, reference is made to the Z80-SIO and Z80-CTC Technical Manuals and other commercial literature available from Zilog, Inc., and other sources.

In this example, the Z80 microprocessor 32 is driven at a frequency of 3.6864 Mhz by CLOCK signals received from the clock circuit 33 shown in FIG. 3. The Z80 microprocessor 32 accesses a 2k-byte external random access memory (Z-RAM) 34 for temporarily storing and formatting data and for storing control and status information. As seen in FIG. 8, the addresses for the external Z-RAM 34 are in a range from 8k (8,192) to 10k (10,240) of the microprocessor address range. The Z80 microprocessor 32 also accesses an 8k-byte erasable programmable read-only memory (EPROM) 35, which is seen in FIG. 3, and which stores processor instructions that are read and executed by the microprocessor 32 to perform its many functions. As seen in FIG. 8, these processor instructions are organized in a program which is addressed in a range from 0 to 8k of the microprocessor address range. Since these instructions are encoded in the physical structure of the EPROM 35, and are retained even if power is turned off, they are referred to as "firmware."

The Z80 microprocessor 32 controls the reading of processor instructions from the EPROM 35 and the reading and writing of data in the RAM 34 by generating addresses through lines ZA0–ZA14 of a sixteen-line address bus (line ZA15 not being used). Lines ZA0–ZA10 connect to address inputs on the Z-RAM 34 to address 2k bytes of data. Lines ZA0–ZA12 connect to address inputs on the EPROM 35 to address 8k bytes of processor firmware. The data and firmware are actually communicated between the microprocessor 32 and the respective memories 34, 35 through the eight lines ZD0–ZD7 of the Z data bus. To activate or enable the various circuits, signals on lines ZA12–ZA14 are coupled to a chip select circuit 36, where they are decoded to select one or the other of the memories 34,35, or bus-controlling buffers 37,38 according to their assigned address space and the address present on the address bus.

The Z80 microprocessor 32 also communicates with the common random access memory (C-RAM) 26 to couple data to and from the serial data channel 11. Lines ZA0–ZA10 of the Z80 address bus are coupled through buffer 37 to address inputs on the C-RAM 26 to address 2k bytes of data. As seen in FIG. 8, these addresses reside in a 2k address range beginning at 12k. Lines ZD0–ZD7 of the Z80 data bus are coupled through buffer 38 to a C-RAM data bus, which connects to the data terminals on the C-RAM 26. The data buffer 38 is enabled at an enable (EN) input through a Z EN line by a signal derived from a combination of signals from the arbitration circuit 27 and the chip select circuit 36. A directional input DIR on the buffer 38 is controlled by the logic state of a read (ZRD) control signal transmitted by the Z80 microprocessor 32 through a buffer (not shown). The address buffer 37 is enabled when two control signals are received, the first is the Z ACK signal from the arbitration circuit 27, and the second is a C-RAM EN signal decoded by the chip select circuit 36 from the signals on lines ZA12–ZA14.

Access to the common memory 26 is available from the other side by transmitting signals through a RAM port connector 23, which connects to RAM PORT SELECT line, RAM PORT READ and WRITE lines, and RAM PORT address and data lines (A0–A10 and D0–D7, respectively). Signals are also coupled through the RAM port connector 23 to the RAM PORT REQ and from RAM PORT ACK lines to obtain access to the common memory 26 as described earlier herein. A set of address buffers 39 and a set of data buffers 40 is enabled in response to active signals on the RAM PORT SEL line and the RAM PORT ACK line.

I/O status data is transferred on lines D0–D7 when either a RAM PORT READ or RAM PORT WRITE signal is present. In the remaining description reference will be made to PORT INPUT operations in which system output status data is read by the peripheral device 15 from the common memory 26. And, reference will also be made to PORT OUTPUT operations in which system input status data is written into the common memory 26 from the peripheral device 15.

Figure 4:
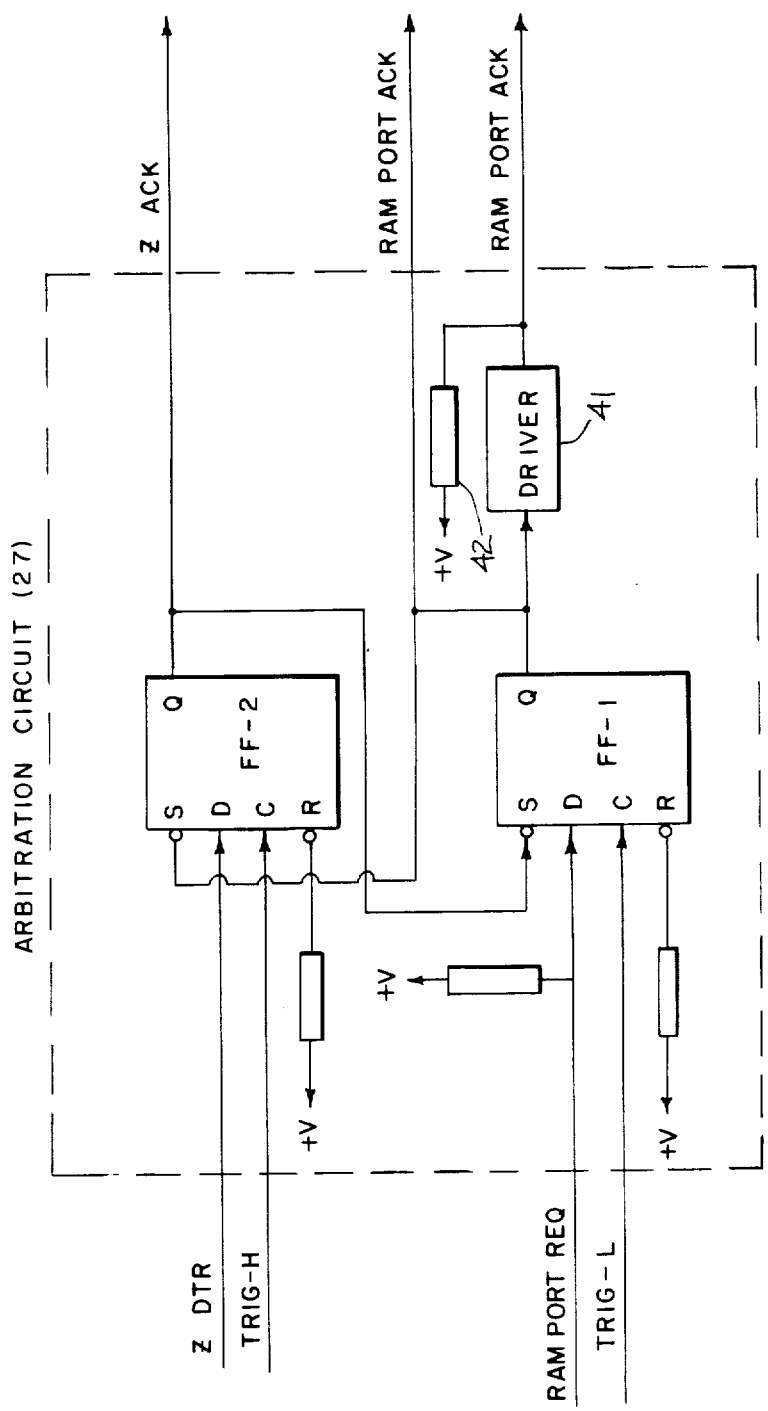
FIG. 4 is a schematic diagram of the arbitration circuit seen in FIGS. 2 and 3.

Referring to FIG. 4, the arbitration circuit 27 will now be described in more detail. The clock circuit 33 in FIG. 3 generates a TRIG-H signal and a TRIG-L signal by clocking a D-type flip-flop (not shown) with the CLOCK signal, and taking the TRIG-H signal and the TRIG-L signal from the Q and $\bar{Q}$ outputs, respectively. The Q output is connected back to the D input through an inverter so that the two outputs toggle on each rising edge of the Z80 clock signal. The TRIG-H signal and the TRIG-L signal are used as the clock signals for a pair of flip-flops FF-1 and FF-2 in FIG. 4.

The processor 25 in the peripheral device 15 transmits a logic low signal (RAM PORT REQ) to the D input of flip-flop FF-1 to request access to the C-RAM 26 When this flip-flop is clocked by the TRIG-L signal, the Q output of this flip-flop is set low-true. This output is connected to the RAM PORT ACK line, and to a driver 41 and a pull-up resistor 42 to transmit a low-true signal back to the processor 25 in the peripheral device 15 that it has access to the C-RAM 26. Signals on the RAM PORT ACK line and the RAM PORT SEL line are the signals used to enable the address buffer 39 mentioned earlier. The data buffer 40 is enabled by a combination of the RAM PORT ACK signal and RAM PORT SEL signal coming from the arbitration circuit 27. The direction of data flow through buffer 40 is controlled by the state of the RAM PORT RD signal. The RAM PORT ACK line is also connected to a low-true set (S) input of the second flip-flop FF-2 to hold its Q output in a high-false state. This Q output connects to the Z ACK line, and thereby prevents the Z80 microprocessor 32 from gaining access while the processor 25 in the peripheral device 15 has access to the C-RAM 26.

Periodically, the processor 25 in the peripheral device 15 must give up access to the C-RAM 26, which it does by signaling a logic high signal to the D input on flip-flop FF-1. On the next TRIG-L clock signal, the Q output goes high to remove both the active RAM PORT ACK signal and the signal holding flip-flop FF-2 set. The Z80 microprocessor 32 clears the Z DTR output on the SIO circuit 30, and this signal is applied to the D input of flip-flop FF-2 to request access to the C-RAM 26. On the next TRIG-H signal, the Q output of the second flip-flop goes low-true to enable the address buffers 37 for coupling address signals A0–A10 from the Z80 microprocessor 32 to the C-RAM 26.

When the Z80 microprocessor 32 has access to the C-RAM 26, access is denied to the peripheral device 15 by transmitting a low-true signal to the set (S) input of flip-flop FF-1 through the Z ACK line. The Z80 microprocessor 32 releases the C-RAM 26 by changing the state of the Z DTR line to a logic high, and on the next active TRIG-H signal, the Q output of flip-flop FF-2 is switched high or "off". This completes the description of the arbitration circuit 27, and this also completes the description of the remote I/O port module 14, except that a list of commercially available circuits for carrying out the invention is provided in Appendix A.

E. Layout of the Common Memory

Figure 5A:
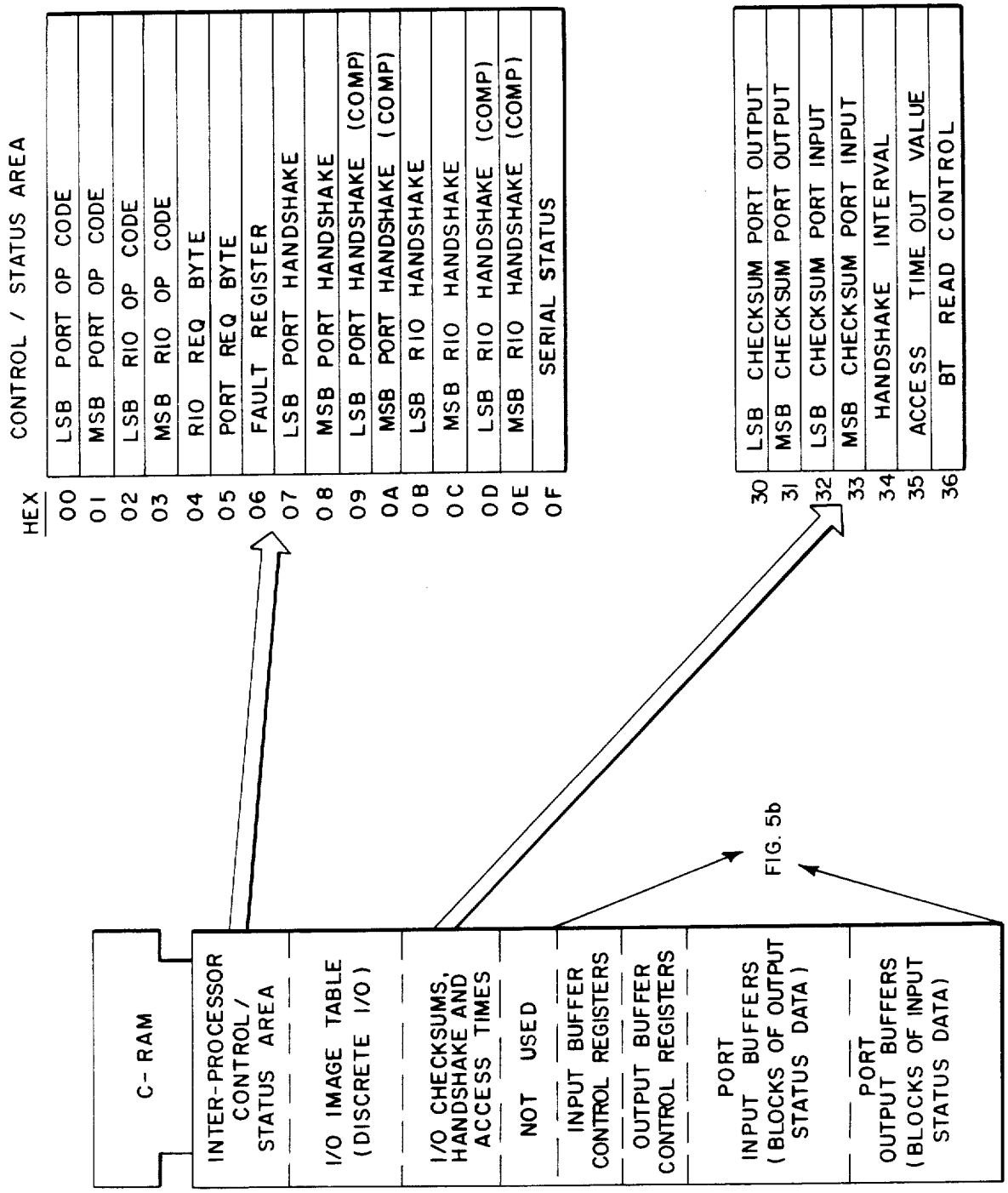
FIGS. 5a and 5b are maps of certain storage areas in the common read/write memory of FIGS. 2 and 3 and the pointers used in selecting particular areas for access.
Figure 5B:
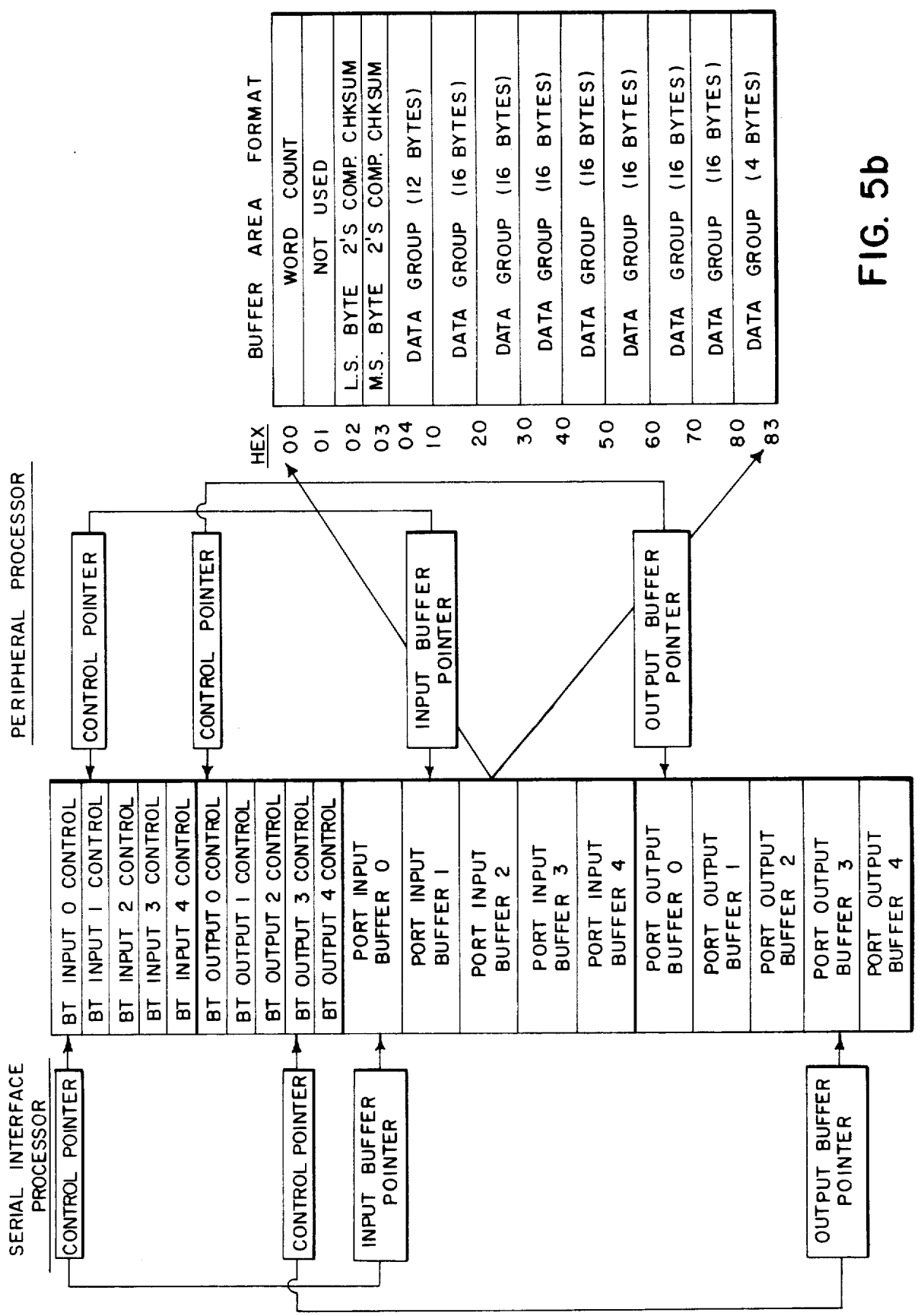

FIGS. 5a and 5b show the organization of data in the C-RAM 26, which is addressed in the 2k-segment of the Z80 microprocessor range beginning at 12k or 3000 (hex) as seen in FIG. 8. In the description that follows relative to FIGS. 5a and 5b the addresses are the relative addresses within this segment.

As seen in FIG. 5a, a first area of sixteen bytes at locations 00–0F (hex) of Page 0 stores inter-processor control and status information. Locations 00 and 01 store the least significant byte (LSB) and most significant byte (MSB) of a PORT operational code that is set by the peripheral processor 25 when it has successfully completed its initial or startup sequence of operations. Locations 02 and 03 store the least significant byte (LSB) and most significant byte (MSB) of an RIO operational code that is set by the serial interface processor 32 when it has successfully completed its initial or startup sequence of operations. Locations 04 and 05 (hex) store request bytes by which the serial interface processor (RIO) and the peripheral processor (PORT), signal that data is available for communication. These bytes also contain status bits signaling a fault or a change in the status of communications. Locations 07–0E store two-byte handshake words for the respective processors, and a two-byte complement (COMP) of each handshake word. Location 0F stores a serial communication status byte with bits signaling various problems that may arise in communicating through the serial data channel.

The next 32-byte area in the C-RAM 26, referred to as an I/O image table, stores discrete bytes of I/O status data, which are mapped to system I/O slot addresses in an I/O rack as discussed earlier. The I/O image table is followed by a seven-byte area at locations 30–36 (hex) for storing checksums for the discrete I/O status data, for storing two timing parameters and for storing a block transfer (BT) read control byte.

The first of the two timing parameters, which can be controlled from the peripheral device 15 or allowed to assume a default value of 20 milliseconds, is the length of a handshake interval. This handshake interval is alternately observed by the peripheral processor 25 and the serial interface processor 32. At the end of its respective handshake interval, each processor will compare the handshake word that is controlled by the other processor with the complement handshake word for the other processor. If the other processor has gained access to the C-RAM 26 within the handshake interval, the addition of the handshake word and its complement will produce a zero result. If the result of this operation is not zero, it means that the other processor is not operating in the expected manner because it is not updating the C-RAM 26 for a period longer than the handshake interval, and the remote I/O port module 14 is not communicating according to the handshake interval parameter. This produces a fault condition, however the remote I/O port module 14 provides some fault tolerance by requiring a repeat of the test and the nonzero result before signaling a fault.

The second of the two timing parameters is the access time out value, which can also be selected by the user and communicated through the peripheral device 15 or allowed to assume a default value. The access time out value must be shorter than the handshake interval, because the peripheral processor must have access to the C-RAM 26 to check the handshake interval and carry out communication with the serial interface processor 32. When the access time out value is set for 2 milliseconds or less, the effective time for which access to the C-RAM 26 may be denied to the peripheral processor 25 is about 3 milliseconds. When the access time out value is set for greater than 2 milliseconds, the effective time for which access to the C-RAM 26 may be denied to the peripheral processor 25 may be extended to as much as 6 milliseconds. Under typical conditions, the serial interface processor 32 will retain control of the C-RAM for approximately 1.5 milliseconds when transferring block transfer I/O status data, and for 1 millisecond or less when transferring discrete I/O status data.

Following the I/O checksums and timing parameters is an unused area of memory extending up to location CA (hex) in Page 2 of the C-RAM 26, where the first of a group of input buffer control registers resides. These control registers are related to a group of PORT input buffers, also seen in FIG. 5a, which store blocks of output status data to be sent to the peripheral processor 23 through the parallel I/O port. Similarly, the C-RAM 26 also stores a group of output buffer control registers, which are related to PORT output buffers that store blocks of input status data that are received from the peripheral processor 25 through the parallel I/O port 23.

Referring next to FIG. 5b, the input and output control registers of FIG. 5a are identified as BT INPUT 0 CONTROL-BT INPUT 4 CONTROL and BT OUTPUT 0 CONTROL-BT OUTPUT 4 CONTROL. The area in FIG. 5b below these registers represents the input and output buffers associated with these control registers. The PORT INPUT BUFFER 0 is associated with the BT INPUT 0 CONTROL register, the PORT OUTPUT BUFFER 0 is associated with the BT OUTPUT 0 CONTROL register, and so forth. The buffer areas each hold up to a maximum of 132 bytes of information in the buffer area format shown in FIG. 5b. The buffer contains a word count (bytes divided by two) in line 00 (relative to the buffer area), a 2's complement checksum in lines 02 and 03 and up to 128 bytes of I/O status data in lines 04–83 (hex). The addresses of the buffer areas within the C-RAM 2k-segment do not correlate to the various 256-byte pages, and in some cases overlap page boundaries. The addresses for the buffers are given in Appendix B.

The serial interface processor 32 and the peripheral processor 25 maintain pointer information as an index to the current input and output buffers being addressed for transfer of I/O status data. As seen in FIG. 5b, the serial interface processor 32 maintains pointers for (a) the current input buffer, (b) the current output buffer, (c) the control register associated with the current input buffer, and (d) the control register associated with the current output buffer. The peripheral processor maintains its own set of pointers for what it recognizes as the current input buffer, the current output buffer, and their associated control registers. This allows for asynchronous transfer of I/O status data, because one processor does not have to wait for the other processor to take data before executing a second transfer to the C-RAM 26. This arrangement also allows each processor to transfer up to five blocks of I/O status data to the C-RAM, independent of the activities of the other processor.

F. Programmed Operation of the Z80 Microprocessor

Figure 9A:
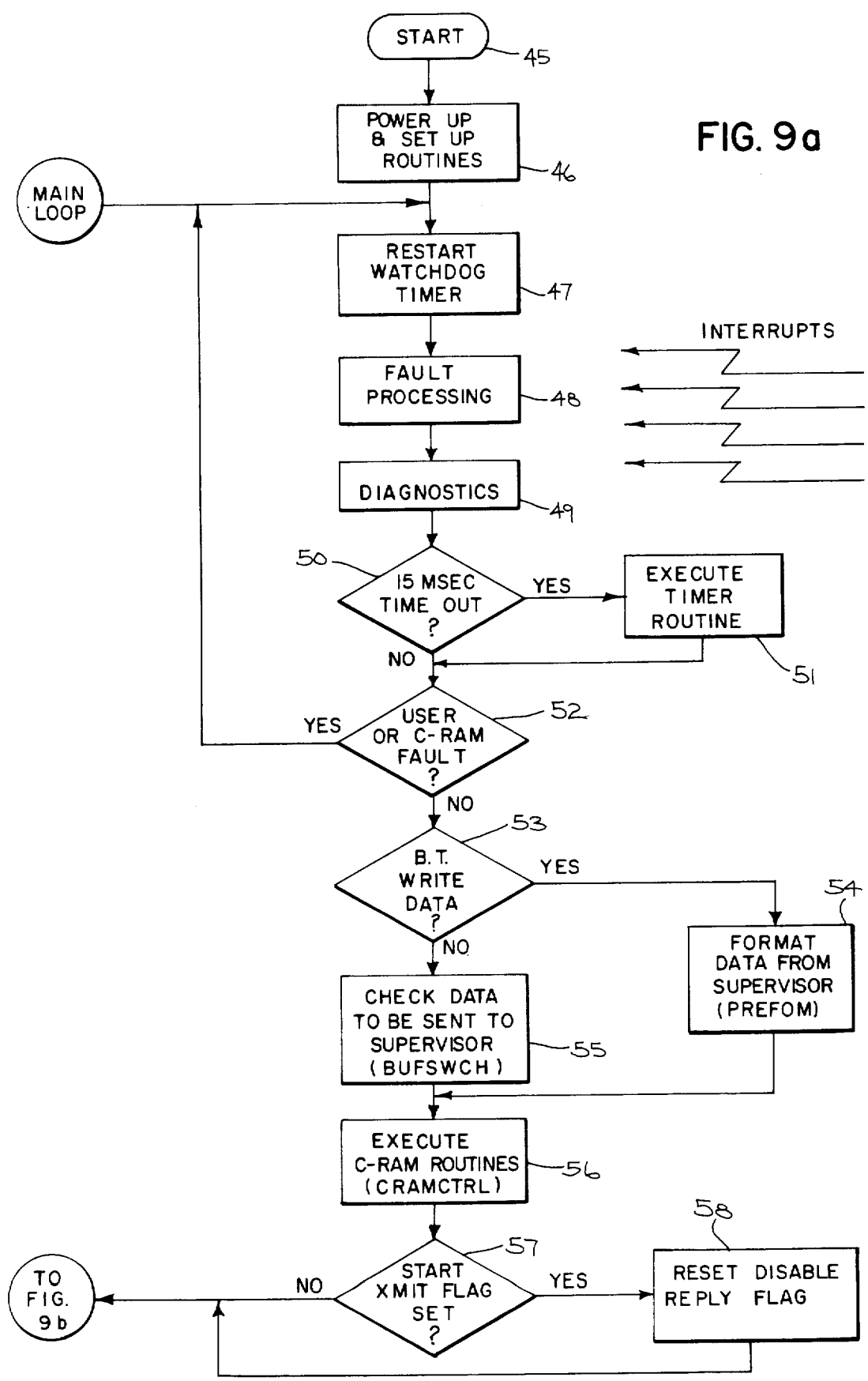
FIGS. 9a and 9b are a flow chart of a main loop of program routines executed by the serial interface processor of FIG. 3.

Referring to FIG. 9a, on application of power, represented by start block 45, the serial interface processor 32 executes a series of power up and set up routines represented by process block 46. These include the following diagnostic sequences:

(1) an EPROM checksum test to verify the proper operation of the EPROM 35;

(2) a RAM integrity test to verify normal read and write operations from the internal RAM;

(3) a test to verify normal read and write operations relative to the SIO circuit 30;

(4) a test to verify a normal timer interrupt from channel 3 of the CTC circuit 31; and (5) a RAM integrity test to verify accessibility and normal read and write operations from the C-RAM 26.

If these tests are successful, the Z80 microprocessor 32 attempts to gain access to the C-RAM 26. After gaining access, it will first test the C-RAM 26, and then set up an operational status code in lines 02 and 03 of Page 0 of the C-RAM 26, which is seen in FIG. 5a. The serial interface processor 32 then releases the C-RAM 26 to allow the peripheral processor 25 to perform its diagnostics and to signal its operational status at lines 01 and 02 of Page 0 in FIG. 5a. If one of the serial interface processor 32 power up tests is unsuccessful, its operational code is not set up and this will be sensed by the peripheral processor 25 as a hardware fault.

When the serial interface processor 32 has indicated its operational status, and has detected the operational status of the peripheral processor 25, it continues executing start up routines to read the handshake interval value, the access timeout value and the BT read control byte. The serial interface processor 32 then takes two actions to initiate handshaking with the peripheral processor 25. First, it complements the PORT handshake byte and stores it in the C-RAM as the PORT handshake complement byte. And second, it increments its own RIO handshake byte. The SIO circuit and the CTC circuit 31 are then activated for generating interrupt signals.

Figure 9B:
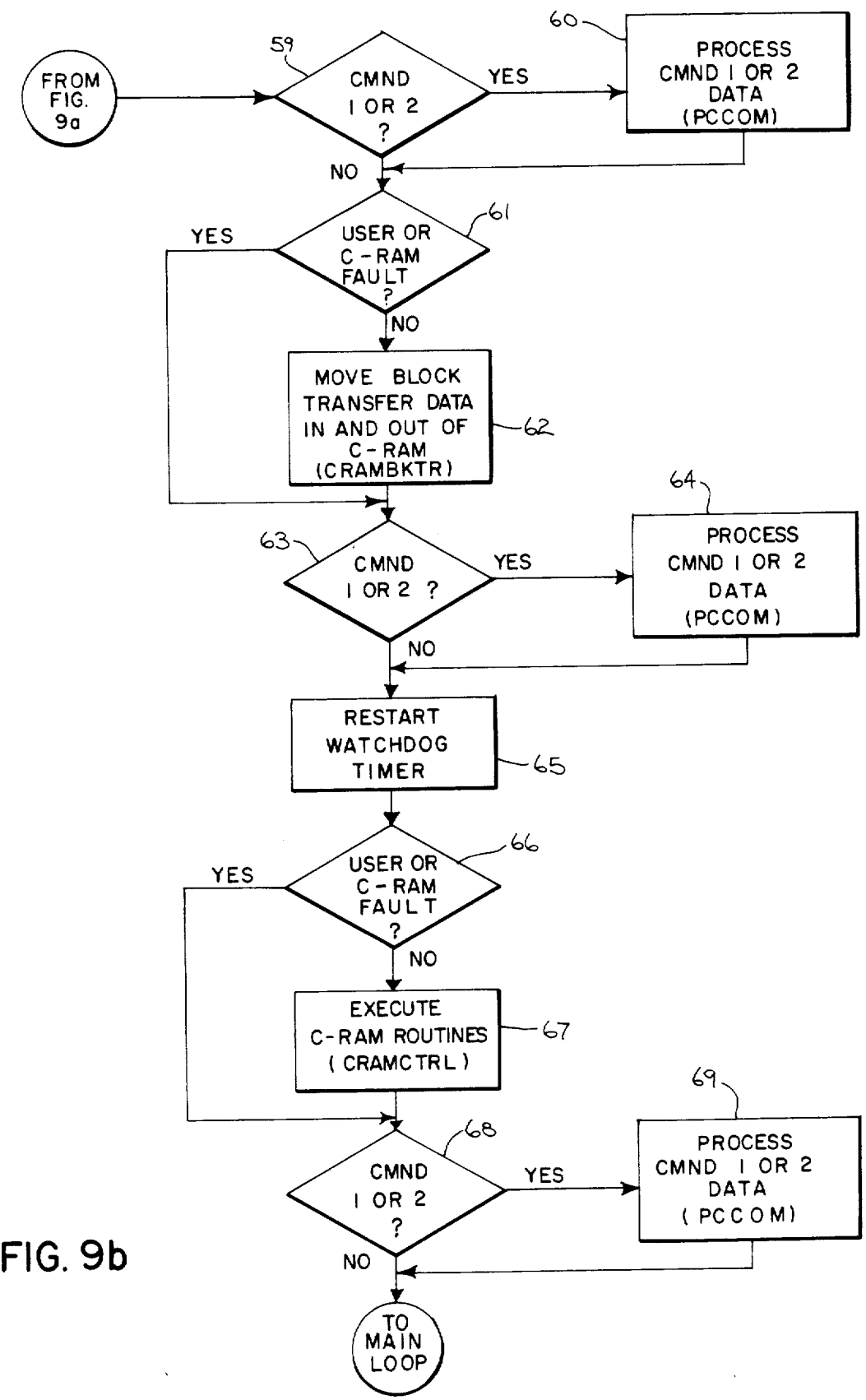

After initialization is complete, the serial interface processor 32 proceeds to the first block in a MAIN LOOP of routines represented by blocks 47-69 in FIG. 9a and 9b. Process block 47 represents the start or restart of a software watchdog timer that times out in 17 milliseconds if not restarted. If the timer times out, the serial interface processor 32 stops operation. Process block 48 represents execution of instructions to check for the fault status of the serial interface processor 32. If a fault is indicated a fault handling routine is called to determine the type of fault and the next action to be taken. Process block 49 represents a block of diagnostics instructions, which are periodically executed to check the operation of the RAM circuits. Assuming no faults, the serial interface processor 32 then checks a time out flag, which is represented by decision block 50, to determine whether a 15-millisecond time out has occurred. If the test is positive, as represented by the "YES" branch, the serial interface processor 32 calls a timer routine represented by process block 51. In executing this routine the serial interface processor 32 determines whether a number of 17-millisecond time out signals have been generated since the last valid frame has been received over the serial data channel 11. If 100 milliseconds have passed (7 time out signals @ 15-milliseconds), a fault is signaled. The circuitry and programming to accomplish the 100-millisecond timing function is referred to as the communication watchdog timer.

If a 15-millisecond time out is not signaled, as represented by the "NO" result following decision block 50 in FIG. 9a, the serial interface processor 32 then checks several fault flag bits to determine if there has been a fault signaled from the C-RAM 26 or from the peripheral device 15, and this is represented by decision block 52. If such a fault is detected, the Z80 loops back to execute blocks 47 and 48 to resolve the fault.

Assuming no such faults are detected in executing the test in decision block 52, the serial interface processor 32 checks a flag bit in memory to see whether a block of "block transfer" write data has been received from the programmable controller processor 10, as represented by decision block 53. If such data has been received, as represented by the "YES" result, the serial interface processor 32 next executes a PREFOM routine represented by process block 54 in FIG. 9a and by block 71 in FIG. 10 to format the block of I/O status data before it is transferred to the C-RAM 26. Then, as represented by process block 55 in FIG. 9a, the serial interface processor 32 executes a group of CRAMCTRL routines for transferring discrete I/O status data to and from the C-RAM 26.

Figure 10:
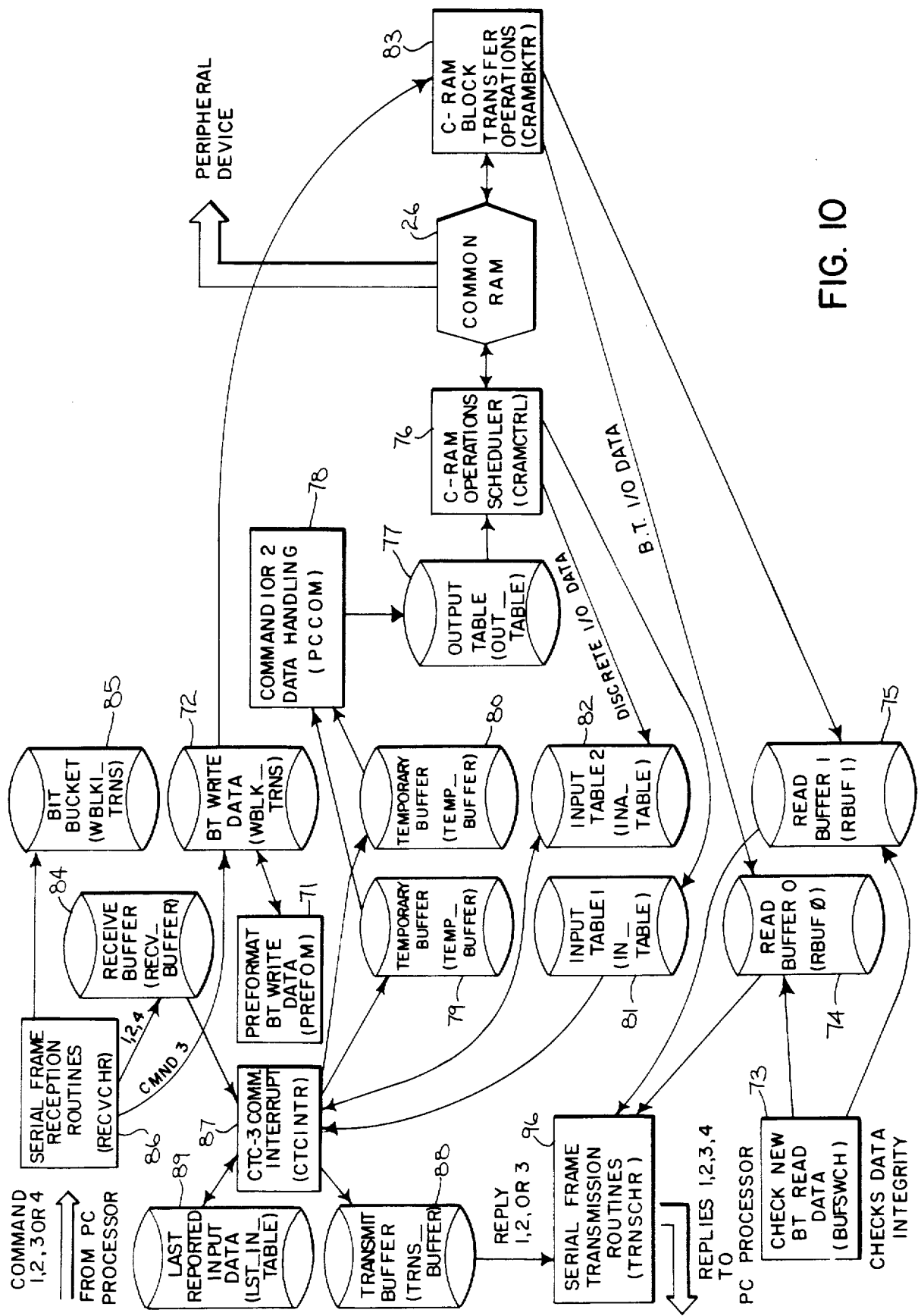
FIG. 10 is a data flow diagram showing how I/O status data is moved between the serial I/O port and the common memory.

When a block of data is not detected as a result of executing the instruction represented by decision block 53, the serial interface processor 32 executes a BUFSWCH routine represented by process block 55 in FIG. 9a and by block 73 in FIG. 10. This routine checks for new I/O status data from the C-RAM 26. If new I/O status data is present, a subroutine is called to verify the integrity of the data with a checksum test. If a new block of data for the block transfer mode is detected, this subroutine fills any unused area in the input table with data bytes of zeroes up to 128 bytes.

After executing either the PREFOM routine or the BUFSWCH routine, the serial interface processor 32 executes the CRAMCTRL routines represented by process block 56. The C-RAM sequences are also represented by the block 71 in FIG. 9 labeled CRAMCTRL, the acronym used in Appendix B. In executing this routine, the serial interface processor 32 updates the handshake word that will be examined by the peripheral processor 25. Then, discrete I/O status data is transferred, with input status data in the C-RAM 26 being moved to one of two input tables (IN_TABLE and INA_TABLE) represented by barrels 81 and 82, and with outputs status data in the output table (OUT_TABLE)77 being moved to the C-RAM 26. Various other miscellaneous operations are also carried out, such as verifying the I/O status data, transferring processor status information, and selecting one of the tables 81, 82 for transfer of input status data to the programmable controller processor 10.

After returning from the CRAMCTRL routine 56, a check is made, as represented by decision block 57, to determine whether a "start transmission" flag bit is set. If the result is "YES", a "disable reply" bit is reset to allow data to be sent back to the programmable controller processor 10. This operation is represented by process block 58 in FIG. 9a. After this event or upon a "NO" result from executing the instruction represented by decision block 57, the serial interface processor 32 proceeds to the next part of the program represented in FIG. 9b.

Referring next to FIGS. 9b and 10, after performing transfers to and from the C-RAM 26, the serial interface processor 32 checks for the receipt of discrete I/O status data (also referred to as Command 1 or Command 2 data) in temporary buffer 79 in FIG. 9b by executing instructions represented by decision block 59 in FIG. 9b. If such data has been received in the temporary buffer 79, it is awaiting transfer to the output table (OUT_TABLE)77. This transfer is performed by calling a PCCOM subroutine represented by process block 60 in FIG. 9b. This sequence of blocks 59 and 60 is preferably executed upon return from access to the C-RAM 26 as a technique for avoiding interruption of the PCCOM routine when accessing the C-RAM 26. Such an interruption might cause data being transferred into the output table 77 to become mixed with a previously transferred group of data awaiting further transfer to the C-RAM 26.

The remote 1/0 port module 14 includes a discrete/-block transfer mode selection switch (not shown in the drawings). When the block transfer mode is selected, discrete I/O status data will still be communicated, but the output data byte corresponding to the first slot (system I/O address) within the range of system I/O addresses applicable to the remote I/O port module 14 will then be interpreted as a module control byte (MCB) for a block transfer operation, rather than as a byte of I/O status data.

After executing the PCCOM routine, the serial interface processor 32 checks the fault status of the C-RAM 26 and of the communication with the peripheral device 15 as represented by decision block 61. If a fault is indicated the serial interface processor 32 skips the next block 62. Assuming no such fault, a CRAMBKTR subroutine, represented by process block 64 in FIG. 9b and by block 83 in FIG. 10, is called and executed to handle transfer of block transfer I/O status data between the Z-RAM 34 and the C-RAM 26.

The peripheral device 15 can be programmed to select either a continuous or "new data only" mode of operation for "read" block transfers, i.e. transfers upstream to the programmable controller processor 10. A programmed byte is transferred into the BT READ CONTROL location at 36(hex) in FIG. 5b to make this selection. In the continuous mode, block transfer data will be sent to the programmable controller processor 10 whether or not it has been updated as new data from the C-RAM 26. In the other mode, old block transfer data will not be sent a second time to the programmable controller processor 10. This is a "protected update" option that assures that the programmable controller processor 10 will not be receiving "old data".

During execution of the CRAMBKTR subroutine, the serial interface processor 32 checks a control bit to see whether "read" block transfer data is to be moved from the C-RAM 26 to the Z-RAM 34. If so, it checks the output buffer that is currently addressed by its output buffer pointer for the availability of new block transfer data by examining an availability bit in the associated control register. If new block transfer data is not found, the pointer will be incremented, and the other four output control registers will be examined in sequence to see if new data can be found in any of them. If new data is found the availability bit in the corresponding control register is reset, as well as an availability bit in the Port Request byte seen in FIG. 5b. The new data is transferred to one of the read block transfer buffers in FIG. 10. The use of the two buffers is alternated so that data can be transferred from the C-RAM 26 to one buffer while data is present in the other buffer awaiting transmission to the programmable controller processor 10.

The control bit for signalling transfer of "write" block transfer data is examined after the control bit for the "read" block transfer data. Write block transfer data that is received from the serial data channel 11 is stored in the write block transfer data buffer (WBLK$_{13}$TRNS) represented by barrel 72 in FIG. 10. The pointer to the Port input buffers is initialized to the first buffer and incremented after each transfer from the write block transfer data buffer (WBLK$_{13}$ TRNS)72. When one of these transfers is made, the serial interface processor 32 also sets the availability bit in the RIO Request byte seen in FIG. 5a and the availability bit in the control register associated with the Port input buffer that receives the write block transfer data. If the serial interface processor 32 finds that the peripheral device 15 has not yet read the data from the next Port input buffer, the transfer to the C-RAM 26 will be deferred until the buffer has been read, as shown by a change in state of the availability bit in its associated control register. This keeps the blocks of data being sent to the peripheral device 15 in sequence.

After moving blocks of I/O status data either to or from the C-RAM 26, or both, the serial interface processor 32 returns from the CRAMBKTR subroutine to the MAIN LOOP to again check for the availability of discrete I/O status data to be moved to the output table 74. This is represented by decision block 63. If present, the data is moved as represented by process block 64. The watchdog timer is restarted at this time as represented by process block 65. After checking for faults again as represented by decision block 66, the general C-RAM operations are executed again by again calling the CRAMCTRL subroutine, as represented by process block 67. After returning from access to the C-RAM 26, yet another check is made for Command 1 or 2 data, as represented by decision block 68 and any data is transferred as represented by process block 69. The CRAMCTRL routines are executed a second time because it is desired to gain access to the C-RAM 26 frequently, but to limit the duration of each access period. And, because the CRAMCTRL routines are executed again, the PCCOM subroutine is executed upon return from the C-RAM 26, provided that Command 1 or Command 2 data is ready for transfer downstream, as represented by blocks 67 and 68. The loop is then completed by jumping back to execute process block 47 in FIG. 9a.

As the MAIN LOOP of routines is executed, it is periodically interrupted by the interrupt signals and routines shown in FIG. 8. The interrupt signals from the SIO circuit 30 and CTC circuit 31 cause the serial interface processor 32 to vector to one of the interrupt routines represented by blocks 90–95 in FIG. 8. When a start flag byte in one of the Command messages is received by the SIO circuit 30, the circuit achieves synchronization with the incoming data stream. When a non-flag byte is received, a RECEIVE CHARACTER interrupt is generated and the serial interface processor 32 vectors to the routine represented by process block 93 in FIG. 8. It reads the incoming character or byte and compares it with its own system I/O address. If a match is detected, the SIO circuit 30 will be set for successive interrupts of the same type for each byte of information in the frame up to the second CRC byte. A flag bit is set to cause the serial interface processor 32 to save all further bytes in the current frame, up to the CRC bytes. If a matching address is not detected, the flag bit is reset to cause the serial interface processor 32 to ignore any further bytes received in the current frame, up to the CRC bytes.

When the serial interface processor 32 detects a message, it checks the next received byte to determine which of the four types of Command messages is being received. For Command 1, Command 2 or Command 4, a pointer is set up to direct incoming data into a receiver buffer (RECV_BUFFER) represented by barrel 84 in FIG. 10. For a Command 3 message, the pointer is set up to direct incoming data into a BT write data buffer (WBLK_TRNS) represented by barrel 72 in FIG. 10. For a special condition in which a block of I/O status data received in a Command 3 message is to be ignored the pointer is set up to direct incoming data into a "dead end" buffer (WBLK1_TRNS) represented by barrel 8 in FIG. 10.

When the end flag in one of the Command messages is received by the SIO circuit 30, it generates an interrupt address to a SPECIAL RECEIVE CHARACTER ROUTINE represented by process block 94 in FIG. 8. The serial interface processor 32 then obtains the second of the two CRC bytes that were received by the SIO circuit 30 just before the end flag. After receiving the CRC bytes, a check is made to determine whether or not the message was directed to the remote I/O port module 14. An addressing error is assumed when 256 messages have been received without a matching address. If the message is addressed to the remote I/O port module 14, he data in the message is validated by checking a CRC status bit generated by the SIO circuit 30 and by checking the number of bytes received. This completes receipt of a Command message.

Before a reply can be transmitted, the serial data channel 11 must be idle for a specified time to allow transient signals to settle. This is determined either by the reception of a character signaling that the channel has been idle during the data checking, or the SIO circuit 30 can be set up to generate an EXTERNAL STATUS interrupt. The three types of receiver interrupts discussed so far, the RECEIVE CHARACTER interrupt, the SPECIAL RECEIVE interrupt and the EXTERNAL STATUS interrupt, are represented generally by process block 86 in FIG. 10. When the EXTERNAL STATUS interrupt is generated, the serial interface processor 32 vectors to the routine, as represented by process block 95 in FIG. 8. Execution of this routine will detect the condition signaling that the channel has been idle and will introduce an additional delay loop. A further routine is then called to turn off the receiver and to turn on the SIO transmitter, which causes the SIO circuit 30 to send start flag bytes. The CTC communication interrupts represented by process block 91 in FIG. 8 and process block 87 in FIG. 10 are set up to time the transmission of the start flag bytes.

After the timed interval the SIO circuit 30 transmits a further start flag byte that will precede a Reply message to the programmable controller processor 10. The CTC circuit 31 will generate a timer interrupt on its internal channel 3, which is connected to the INT input on the serial interface processor 32. The receipt of the channel 3 interrupt causes the execution of the START AND STOP XMTR routines represented by process block 87 in FIG. 10 and process block 91 in FIG. 8. During execution of these routines the Reply message number is determined and the Reply number byte is loaded into the transmit buffer (TRNS_BUFFER) represented by barrel 88 in FIG. 10.

If a Reply 1 or a Reply 2 is to be sent, a REPLY 12 subroutine (not shown in FIG. 10) is called to format the bytes of data that will be transmitted as part of the message. These are loaded into the transmit buffer 88 at locations following the reply byte. For a Reply 1 message all of the input status data for a rack is transmitted. For a Reply 2 message the I/O status data (input data) are checked for data that has changed since the last such reply message, and a mask byte is set up as part of the reply. Not all of the input status data for the rack is sent in a Reply 2 message, but only a selected pair of bytes and any bytes that have changed since the last reply from the rack. To keep track of data that has changed since that time, the last input status data sent back to the programmable controller processor 10 from each location in the rack is maintained in a table (LST_IN_TABLE) represented by barrel 89 in FIG. 9. The REPLY 12 subroutine also moves incoming I/O status data from the receive buffer 84 to one of the temporary buffers 79, 80.

Upon return to the CTC interrupt routine, the scanner address byte is then loaded into a register in the SIO circuit 30 as the first byte to be transmitted after the start flag byte that was sent earlier, and the interrupt input on the serial interface processor 32 is enabled to receive the interrupt signal that will occur when the transmit buffer has become empty. Before returning from the CTC interrupt routine, the PCCOM subroutine, discussed above, may be executed. The serial interface processor 32 then returns to the MAIN LOOP routines until the next interrupt.

Transmission on the serial data channel is signaled by a succession of TRANSMIT BUFFER EMPTY interrupts, represented by process block 96 in FIG. 10, and by process block 92 in FIG. 8. There are several different sequences of instructions that will be performed depending on whether the interrupt is the first TRANSMIT BUFFER EMPTY interrupt or a succeeding interrupt. On the first such interrupt the type or number of Reply message is determined. If it is a Reply 4, a pointer is st up to transmit data from the proper read block transfer buffer 74,75 as discussed above. The sequence of TRANSMIT BUFFER EMPTY interrupts will select the bytes to follow the scanner address byte in transmission to the programmable controller processor 10, a different sequence of bytes being transmitted for Replies 1 and 2 as compared with Reply 4. For Reply 3 only the Reply byte is sent.

After the string of I/O status data and any checksum or status information has been transmitted, an end interrupt sequence is executed in response to two TRANSMIT BUFFER EMPTY interrupt signals to mark the beginning and completion of transmitting the two CRC bytes from the SIO circuit 30 to the programmable controller processor 10. The serial interface processor 32 then directs the CTC circuit 31 to time a period in which the SIO circuit 30 sends an end flag. A CTC interrupt signal is sent back to the serial interface processor 32 when the end flag has been sent. Upon receiving this interrupt, the serial interface processor 32 causes the SIO circuit 30 to send an abort signal and the CTC circuit 31 to generate a further interrupt to signal completion of this transmission. The transmitter portion of the SIO circuit 30 is then turned off and the receiver portion is turned on to look for a character sent to it from the programmable controller processor 10.

This has been a general description to assist in understanding the operation of the serial interface processor 32. For a full functional description, reference is made to the listing of individual firmware instructions in Appendix B.

G User interface to the Remote I/O Port Module

The following description relates to the steps that are to be taken by the user of a peripheral device 15 to communicate with the programmable controller system described above.

From a hardware viewpoint the user must provide the address, control and data lines which terminate in a connector for the remote I/O port 23 as seen in FIG. 2. In addition, certain other lines of the kind known in the art, such as read and write control, reset and fault communication lines are also desirable.

The peripheral device 15 may be of the type that executes a program in the graphical, ladder-diagram program language known in the art of programmable controllers, or some other type of higher level language, or the peripheral device may be programmed in the assembly language of the particular microelectronic device selected as the peripheral processor 25. In programming the peripheral device in any of the above languages, the program should include a power up-reset routine and routines for transferring blocks of I/O status data to and from the C-RAM 26.

In executing the power up-reset routine, the peripheral device 15 should first gain access to the C-RAM 26 by generating a logic low signal on the RAM PORT REQUEST line in FIG. 2, and awaiting the logic low acknowledge signal on the RAM PORT ACK line. The routine should then provide a test to confirm that data can be read from and written to the C-RAM 26. The user routine should then release control of the C-RAM 26 by changing the state of the signal on the RAM PORT REQUEST line. This is done to allow the serial interface processor 32 to test its ability to read from and write to the C-RAM 26 and perform other diagnostics. If these diagnostics are successful, the serial interface processor 32 will set the RIO operational code at addresses 02-03 (hex) in FIG. 5a to 0001 (hex). If unsuccessful, the serial interface processor 32 will signal a fault by setting one bit in the RIO request byte and other bits in the fault status byte seen in FIG. 5a. The user peripheral device 15 is limited to a period such as 100 milliseconds to verify the RIO operational code or a fault is declared by the serial interface processor 32. After releasing access to the C-RAM 26 for at least 3 microseconds, the user peripheral device 15 should again attempt to gain access for the purpose of verifying the RIO operational code or detecting a fault.

When the user peripheral device 15 detects the RIO operational code during the power up-reset routine, it should then transfer the handshake interval parameter, the access time out parameter and the block transfer read control byte to their locations at 34-36 (hex) in FIG. 5a. The user peripheral device 15 should then set its PORT operational code at addresses 00-01 (hex) seen in FIG. 5a to 0001 (hex). This also should be accomplished within a time period, such as 100 milliseconds from the time the C-RAM 26 is released by the serial interface processor 32, to prevent the serial interface processor 32 from declaring a fault.

The user peripheral device 15 must periodically gain access to the C-RAM 26, whether or not data is transferred, to meet the timing requirements determined through the handshake interval parameter and the access time out parameter. When accessing the C-RAM 26, the serial interface processor 32 increments a PORT handshake word and stores it. When accessing the C-RAM 26 the peripheral processor 25 should complement the two-byte PORT handshake word. During a subsequent access to the C-RAM 26, the serial interface processor 32 adds the PORT handshake word to the PORT handshake complement word to check for a zero result that confirms that the peripheral device 15 has gained access to the C-RAM 26 within the last handshake interval. The serial interface processor 32 also complements an RIO handshake word. The peripheral processor 25 then adds the complement of the RIO handshake word and to the RIO handshake word to check for a zero result that confirms that the serial interface processor 32 has gained access to the C-RAM 26 within the last handshake interval. The peripheral processor 15 then increments the RIO handshake word for the next handshaking cycle.

The user peripheral device 15 must operate a hardware or software timer to be reset or reloaded upon each verification of a handshake with the serial interface processor 32. The time out value for this timer is determined by the handshake interval parameter. If the time out value is reached, or if the timer has timed down to zero from the time out value, the handshake interval has been exceeded and the user peripheral device 15 declares a fault based on the lack of communication with the C-RAM 26 by the serial interface processor 32.

The user peripheral device 15 should also be programmed to limit its period of access to the C-RAM 26, so as not to deny access to the C-RAM 26 by the serial interface processor 32 for a time longer than the time determined by the access time out parameter. When the serial interface processor 32 is attempting to gain access to the C-RAM 26, it maintains a software loop counter that can be compared or counted down from the access time out value to see whether access has been denied for a time greater than the access time out value. If this occurs a fault code will be entered in the fault register at location 06 (hex) in FIG. 5a, and a fault bit is set in the RIO request byte. These locations should be examined periodically by the user peripheral device 15.

Assuming it has access, the user peripheral device 15 can be programmed with byte or block transfer routines within the capabilities of those skilled in the art to transfer discrete I/O status data to and from the I/O image table area shown in the C-RAM 26 in FIG. 5a. The user peripheral device 15 should also calculate an appropriate two-byte checksum for the data placed in the C-RAM 26. This checksum should be transferred to locations 30 and 31 (hex) in FIG. 5a. When discrete I/O status data is read from the I/O image table by the peripheral device 15, it should also read the associated checksum which the serial interface processor 32 has placed in locations 32 and 33 (hex) in the C-RAM 26.

The remote I/O port module 14 includes a switch (not shown in the drawings) for selecting either a discrete I/O mode or block transfer mode of operation. Assuming this switch is positioned for operation in the block transfer mode, the user peripheral device 15—when programmed with block transfer routines within the capabilities of those skilled in the art—can transfer blocks of I/O status data to and from the PORT output and input buffers shown in the C-RAM 26 in FIG. 5b. During startup or initialization, the user peripheral device 15 should select one of the two options available for the BT read control byte at location 36 (hex) in FIG. 5a. The pointers for the PORT buffers should be initialized to point to the PORT INPUT BUFFER 0 and to the PORT OUTPUT BUFFER 0 and their associated control registers, and these pointers should be saved by the peripheral processor 25 in an associated memory.

To execute a PORT output of a block of input status data going to the programmable controller processor 10, the peripheral processor 25 must first get access to the C-RAM 26 and then refer to the pointers to the current PORT output buffer and its associated control register. If a block of input status data is ready for transfer, the availability bits should be set in the PORT request byte and in the associated output buffer control register. If more than one block of input status data is ready for transfer, the peripheral processor 25 increments the pointers to the next PORT output buffer and its associated control register. If the availability bit in this next control register is already set it means that this buffer and the remainder of fivebuffer area is full, and transfer of succeeding blocks of input status data must be deferred. The peripheral processor 25 should set a control bit and refer back to this control register until it detects the resetting of the control register availability bit by the serial interface processor 32 as a signal that the data has been taken. In performing the transfer of input status data to one or more of the PORT output buffers, the peripheral processor 25 should limit its time in the C-RAM 26 and verify handshaking operations as discussed above.

To execute a PORT input of a block of output status data being received from the programmable controller processor 10, the peripheral processor 25 must first get access to the C-RAM 26 and then refer the pointers to the current PORT input buffer and its associated control register. The peripheral processor 25 should examine the availability bits in the RIO request byte and in the applicable control register. If these bits are set to indicate the availability of output status data, the data in the current buffer should be transferred to the peripheral device 15. The availability bit in the current control register should then be reset to signal that the data has been taken. The pointers to the input buffer and its associated control register are then incremented and the availability bit in this next control register is tested to see if another block of output status data is ready for transfer. If this bit is not set it means that this buffer and the remainder of the five-buffer area is empty, and the availability bit in the RIO request byte should also be reset. The peripheral processor 25 should then store the pointer to refer back to this control register when it next gains access to the C-RAM 26 for the purpose of executing an input of block transfer data. When receiving output status data from one or more of the PORT output buffers, the peripheral processor 25 should limit its time in the C-RAM 26 and verify handshaking operations as discussed above.

Appendix A
COMPONENT APPENDIX

| Component | Ref. No. | Description |
|---|---|---|
| SIO circuit | 30 | Z80-SIO serial input/output circuit available from Zilog, Inc. |
| CTC circuit | 31 | Z80-CTC counter/timer circuit available from Zilog, Inc. |
| Microprocessor | 32 | Z80-CPU available from Zilog, Inc. |
| Z-RAM | 34 | 6116 2k × 8-bit random access memory available from Hitachi |
| EPROM | 35 | 2764 8k × 8-bit erasable programmable read-only memory available from Seeq or Hitachi |
| Chip select circuit | 36 | 74LS375 4-bit bistable latch; 74LS138 three-to-eight-line decoder; one 74LS367 non-inverting buffer; one of four SN 74LS00 quad two-input NAND gates; one of six 7404 hex inverters, all available from Texas Instruments, Inc. |
| Address buffers | 37 | Two 74LS541 octal buffers, line drivers, line receivers available from Texas Instruments, Inc. |
| Data buffers | 38 | 74ALS245 octal bus transceivers available from Texas Instruments, Inc. |
| Flip-flops | FF-1 FF-2 | 74LS74 dual D-type flip-flops available from Texas Instruments, Inc. |
| Common memory (C-RAM) | 26 | 6116 2k × 8-bit random access memory available from Seeq or Hitachi |
| Address buffers | 39 | Two 74LS541 octal buffers, line drivers, line receivers available from Texas Instruments, Inc. |
| Data buffer | 40 | 74ALS245 octal bus transceivers available from Texas Instruments, Inc. |

We claim:

1. A method of accessing a programmable controller system at a location remote from a programmable controller processor, wherein I/O data for monitoring and controlling conditions on controlled equipment is transferred between the programmable controller processor and remote modules through periodic execution of a I/O scan sequence in which remote modules are addressed in sequence at system-mapped I/O addresses, the method comprising:

coupling an external peripheral device to an I/O port on a remote module, wherein the remote module includes a serial communication controller that communicates during the I/O scan sequence through one end of serial communication channel to exchange I/O data with a programmable controller processor at an opposite end of the serial communication channel, the remote module also having a common memory accessible through the I/O port and accessible by the serial communication controller, and the remote module also having an arbitration circuit for controlling access to the common memory;

obtaining access to the common memory through a first group of signals coupled between the external peripheral device and the arbitration circuit, wherein a first signal in the first group is initiated by the external peripheral device and transmitted to the arbitration circuit;

determining the availability of one of a plurality of buffer areas in the common memory for transfer of a block of data between the common memory and the external peripheral device, wherein the plurality of buffer areas are addressed at system-mapped I/O addresses generated during the I/O scan sequence;

determining the availibility of a block of data for transfer between the external peripheral device and one of the plurality of buffer areas in the common memory; and if one of the plurality of buffer areas and a block of data area available, transferring the block of data between the external peripheral device and the one buffer area in the common memory, the external peripheral device communicating a second group of signals, including address, control and data signals, with the remote module to carry out transfer of I/O data with the common memory; and releasing access to the common memory by the external peripheral device to permit access to the common memory by the serial communication controller.

2. The method of claim 1, wherein:

access to the common memory is obtained by generating the first signal in the first group from the external peripheral device to the arbitration circuit through the I/O port, and availability of the common memory is determined by the external peripheral device by receiving a second signal in the first group from the arbitration circuit; and wherein access to the common memory is released for access by the serial channel controller by causing the external peripheral device to terminate the first signal through the I/O port.

3. The method of claim 1, wherein the block of I/O data includes bytes of data that are associated with system-mapped I/O addresses for respective I/O slot addresses for respective I/O slots within an I/O rack 4. The method of claim 1, wherein the block of 1/0 data includes bytes of data that are associated as a block with a system-mapped I/O address for an individual I/O slot within an I/O rack.

5. The method of claim 1, wherein:

the availability of a plurality of blocks of data is determined;

wherein, if available, the plurality of blocks of data is transferred relative to respective areas in the common memory for receiving or providing data according to the direction of data transfer;

wherein one block of data includes bytes of data that are associated with system-mapped I/O addresses for respective I/O slots within an I/O rack; and wherein another block of data includes bytes of data that are associated as a block with a system-mapped I/O address for an individual I/O slot within an I/O rack.

6. The method of claim 1, wherein:

the availability of a block of data is determined by fetching a buffer index that indicates one of a series of buffer areas in the common memory, and by testing for the availability of a first block of data for transfer relative to the indicated buffer area; and if a block of data is unavailable for transfer relative to the first indicated buffer area, advancing the buffer index to a succeeding buffer area in the common memory, and testing for the availability of a block of data for transfer relative to the succeeding buffer area.

7. The method of claim 1, further comprising the step of:

monitoring a period of access to the common memory by the external peripheral device to confirm that the serial communication controller has not been denied access to the common memory for longer than a predetermined access interval.

8. The method of claim 1, further comprising' checking a first handshake word in the common memory to confirm access to the common memory by the serial communication controller within a first predetermined handshake interval; and checking a second handshake word in the common memory to confirm access to the common memory by the external peripheral device within a second predetermined handshake interval.

9. The method of claim 1, wherein the availability of a plurality of blocks of data is determined, and wherein, if available, one or more of the plurality of blocks of data is transferred to a series of buffer areas in the common memory associated with an individual system-mapped I/O address by:

(a) fetching a buffer index to the series of buffer areas in the common memory, (b) testing for the availability of a first block of data for transfer relative to a first one of the buffer areas indicated by the buffer index, (c) if the first one of the buffer areas is available, transferring a first block of data relative to (d) advancing the buffer index to a succeeding one of the buffer areas in the common memory, (e) testing for the availability of a block of data for transfer relative to the succeeding buffer area, (f) if a block of data relative to the succeeding one of the buffer areas is available, transferring the block of data relative to the succeeding buffer area, and (g) executing and repeating steps d), e) and f) until it is determined that a block of data is unavailable for transfer relative to a buffer area pointed to by the buffer index.

10. The method of claim 9, wherein the buffer index is advanced from a last one of the buffer areas in the series to the first one of the buffer areas in the series.

11. A method of accessing a programmable controller system at a location remote from a programmable controller processsor, wherein I/O data for monitoring and controlling conditions on controlled equipment is transferred between the programmable controller processor and remote modules through execution of an I/O scan sequence in which remote through execution of an I/O scan sequence in which remote modules are address to update I/O data within the programmable controller system, the method comprising:

coupling an external device to an I/O port on a remote module, wherein the remote module includes a serial interface processor that communicates during the I/O scan sequence through one end of a serial communication channel to exchange I/O data with a programmable controller processor at an opposite end of the serial communication channel, the remote module also having a common memory accessible through the 1/0 port for transfer of I/O data and accessible by the serial interface processor for transfer of I/O data, and the remote module also having an arbitration circuit for controlling access to the common memory;

obtaining access to the common memory for transfer of I/O data through signals coupled between the external peripheral device and the arbitration circuit;

checking that a first handshake word in the common memory has previously been updated by the serial interface processor to confirm access to the common memory by the serial interface processor within a first handshake period;

monitoring a period of access to the common memory by the external peripheral processor to confirm that the serial interface processor has not denied access to the common memory for longer than a predetermined access period; and updating a second handshake word in the common memory to be processed by the serial interface processor confirm access to the common memory by the external peripheral processor within a second handshake period.

12. An I/O communication module for transfer of I/O data through a serial data channel, the serial data channel being disposed in a communication path to a programmable controller processor from a peripheral processor that is external to a programmable controller system, wherein the I/O data is of the type that is updated through execution of an I/O scan sequence in which I/O modules are periodically and sequentially addressed at system-mapped 1/0 addresses, the I/O communication module comprising:

serial channel controller means with a serial 1/0 port for communicating I/O status data as serial data over the serial data channel during the execution of the I/O scan sequence, the serial channel controller means storing the I/O data as a block of I/O status data;

I/O port means adapted to be coupled to the peripheral processor and cooperable with the peripheral processor for transferring blocks of I/O data;

a common memory and arbitration circuitry coupling the serial channel controller means and the I/O port means for alternating access of the serial channel controller means and the peripheral processor to the common memory; and wherein the serial channel controller means and the peripheral processor asynchronously communicate blocks of I/O data through the common memory to link the peripheral processor with the serial data channel, and wherein the common memory includes a plurality of buffer areas which are communicated with in response to the system-mapped I/O addresses generated during the I/O scan sequence.

13. The I/O communication module of claim 12, wherein the serial channel controller means includes:

means for checking a first handshake word in the common memory to confirm access to the common memory by the peripheral processor within a first handshake period; and means for updating a second handshake word in the common memory to be processed by the peripheral processor to confirm access to the common memory by the serial interface processor within a second handshake period.

14. The I/O communication module of claim 12, wherein the plurality of buffer areas includes:

a buffer area for storing one block of discrete I/O data which includes bytes of I/O data associated with system-mapped I/O addresses for respective slots of an I/O rack; and buffer areas for storing a plurality of blocks of I/O data associated with a system-mapped I/O address for an individual I/O slot within an I/O rack.

* * * * *

UNITED STATES PATENT AND TRADEMARK OFFICE
CERTIFICATE OF CORRECTION

PATENT NO. : 4,809,217
DATED : Feb. 28, 1989
INVENTOR(S) : Floro, et al.

Page 1 of 2

It is certified that error appears in the above—identified patent and that said Letters Patent is hereby corrected as shown below:

| | |
|---|---|
| Column 12, line 45 | Add period (.) after C-RAM 26. |
| Column 18, line 26 | Subscript "13" should be "____". |
| Column 18, line 30 | Subscript "13" should be "____". |
| Column 19, line 36 | "8" should be --85--. |
| Column 19, line 50 | "he data" should be --the data--. |
| Column 23, line 14 | "when" should not be hyphenated. |
| Column 24, line 60 | "of serial" should be -- of a serial--. |
| Column 25, line 14 | "availibility" should be --availability--. |
| Column 25, line 19 | "area" should be --are--. |
| Column 25, line 47 | "1/0" should be --I/O--. |
| Column 26, line 37 | After "relative to" should be --the first buffer area--. |
| Col. 26, lines 58-59 | Delete "through execution of an I/O scan sequence in which remote". |
| Column 26, line 59 | "address" should be --addressed--. |
| Column 26, line 62 | "external device" should be --external peripheral device--. |
| Column 27, line 2 | "1/0" should be --I/O--. |
| Column 27, line 35 | "1/0" should be --I/O--. |

UNITED STATES PATENT AND TRADEMARK OFFICE
CERTIFICATE OF CORRECTION

PATENT NO. : 4,809,217
DATED : Feb. 28, 1989
INVENTOR(S) : Floro, et al

It is certified that error appears in the above-identified patent and that said Letters Patent is hereby corrected as shown below:

Column 27, line 37 "1/0" should be -- I/O --.

Signed and Sealed this

Second Day of January, 1990

Attest:

JEFFREY M. SAMUELS

Attesting Officer     Acting Commissioner of Patents and Trademarks